: (12) United States Patent
Park et al.

(10) Patent No.: US 9,021,430 B2
(45) Date of Patent: Apr. 28, 2015

(54) METHOD OF DETERMINING MULTIMEDIA ARCHITECTURAL PATTERN, AND APPARATUS AND METHOD FOR TRANSFORMING SINGLE-CORE BASED ARCHITECTURE TO MULTI-CORE BASED ARCHITECTURE

(75) Inventors: Soo Yong Park, Seoul (KR); Seung Won Lee, Hwaseong-si (KR); Shi Hwa Lee, Seoul (KR); Soo Jin Park, Seoul (KR)

(73) Assignees: Samsung Electronics Co., Ltd., Suwon-Si (KR); Industry-University Cooperation Foundation Sogang University, Seoul (KR)

( * ) Notice: Subject to any disclaimer, the term of this patent is extended or adjusted under 35 U.S.C. 154(b) by 402 days.

(21) Appl. No.: 13/332,008

(22) Filed: Dec. 20, 2011

(65) Prior Publication Data

US 2012/0159428 A1   Jun. 21, 2012

(30) Foreign Application Priority Data

Dec. 21, 2010   (KR) .................. 10-2010-0131674

(51) Int. Cl.
   *G06F 9/44*   (2006.01)
(52) U.S. Cl.
   CPC . *G06F 8/314* (2013.01); *G06F 8/36* (2013.01)
(58) Field of Classification Search
   None
   See application file for complete search history.

(56) References Cited

U.S. PATENT DOCUMENTS

| 5,812,852 | A | 9/1998 | Poulsen et al. |
| 6,243,863 | B1 | 6/2001 | Kothari et al. |
| 7,047,232 | B1 | 5/2006 | Serrano |
| 7,681,185 | B2 | 3/2010 | Kapoor et al. |
| 2005/0188364 | A1 | 8/2005 | Cockx et al. |
| 2005/0226252 | A1* | 10/2005 | Tomita ................. 370/395.42 |
| 2006/0059027 | A1* | 3/2006 | Berenbach et al. ............ 705/7 |
| 2007/0283358 | A1* | 12/2007 | Kasahara et al. ........... 718/104 |
| 2009/0313324 | A1* | 12/2009 | Brooks et al. ............... 709/203 |
| 2009/0320029 | A1* | 12/2009 | Kottomtharayil ........... 718/102 |
| 2010/0185634 | A1 | 7/2010 | Eggebraaten et al. |
| 2010/0199257 | A1* | 8/2010 | Biggerstaff ................. 717/104 |
| 2010/0218196 | A1* | 8/2010 | Leung et al. ................. 718/107 |
| 2010/0223213 | A1* | 9/2010 | Su et al. ........................ 706/12 |
| 2012/0130680 | A1* | 5/2012 | Zink et al. .................... 702/186 |
| 2012/0159459 | A1* | 6/2012 | Turner et al. ................ 717/138 |

FOREIGN PATENT DOCUMENTS

| EP | 99309832.6 | 8/2000 |
| JP | 05-094287 | 4/1993 |
| JP | 05-143301 | 6/1993 |

(Continued)

*Primary Examiner* — Don Wong
*Assistant Examiner* — Daxin Wu
(74) *Attorney, Agent, or Firm* — Staas & Halsey LLP

(57) ABSTRACT

A method and apparatus for authoring an architecture for transforming a single-core based embedded software application to a multi-core based embedded software application, and a method of determining an architectural pattern in a multimedia system. It is possible to perform an architecture authoring operation by using an architectural decision supporter, without prior knowledge and accumulated knowledge regarding a software architecture. Additionally, it is possible to prevent an error from occurring during authoring of an architecture, by using a concurrency-related software architectural pattern that is already evaluated. Thus, it is possible to improve overall quality of software, and to reduce a development time.

25 Claims, 24 Drawing Sheets

(56) References Cited

FOREIGN PATENT DOCUMENTS

| | | |
|---|---|---|
| JP | 05-257709 | 10/1993 |
| JP | 07-114516 | 5/1995 |
| JP | 08-166803 | 6/1996 |
| JP | 10-031597 | 2/1998 |
| JP | 10-128159 | 5/1998 |
| JP | 2002-358199 | 12/2002 |
| JP | 2003-091422 | 3/2003 |
| JP | 2004-252508 | 9/2004 |
| JP | 2006-338660 | 12/2006 |
| KR | 100250486 | 1/2000 |
| KR | 10-2005-0001472 | 1/2005 |

* cited by examiner

FIG. 18

Artifact Editor ✕

Properties of Artifact

| Name | SsiLibH264BpPrediction | Type | Source Code | Description of Artifact |
|---|---|---|---|---|
| Reference | None | ID | 251185426 | Type value of I=Macro block is stored. |
| Version | 0.1 | Rights | everyone | |

Contexts

Context [-Select Context-  ▼] [Add]       [-Select Related Artifacts-  ▼] [Add]

| No | Context Name | Context ID | | No | Artifact ID | Artifact Name |
|---|---|---|---|---|---|---|
| 1 | Video | 2750203657 | | | | |

Variability Point Properties

Name [        ]  ID [1713185775]     VP [        ]

Context [-Select Context-  ▼]  Reference [        ] [Add]    Activity [-Select Activity-  ▼] [        ]

[Create]   [Update]   [Delete]

METHOD OF DETERMINING MULTIMEDIA ARCHITECTURAL PATTERN, AND APPARATUS AND METHOD FOR TRANSFORMING SINGLE-CORE BASED ARCHITECTURE TO MULTI-CORE BASED ARCHITECTURE

CROSS-REFERENCE TO RELATED APPLICATIONS

This application claims the priority benefit of Korean Patent Application No. 10-2010-0131674, filed on Dec. 21, 2010, in the Korean Intellectual Property Office, the disclosure of which is incorporated herein by reference.

BACKGROUND

1. Field

Example embodiments of the following description relate to a method of determining an architectural pattern in a multimedia system, and a method and apparatus for authoring an architecture for transforming a single-core based embedded software application to a multi-core based embedded software application.

2. Description of the Related Art

In a hardware system, an affordable processor with multi-core architecture is being launched, and the number of supported cores is increasing. For example, an 8-core server is currently being launched in markets through a quad-core Personal Computer (PC), after a dual-core laptop was released in 2005. However, the phenomenon where the performance of hardware is doubled every 18 months is slowing down. In other words, the limits in improvement of the performance of a system, dependent on hardware only, are being exposed. Multi-core parallelization is considered a problem of software development strategy, rather than of a compiler or an Operating System (OS). Specifically, when software loaded and operated in hardware is developed regardless of parallelism, despite hardware, a compiler, and an OS for supporting even a large number of cores being launched, high quality hardware, a compiler, and an OS may be useless. Accordingly, to maximize the performance of a multi-core based system, there is a desire for a software architecture authoring method for determining software development strategy, and a new framework.

General architecture authoring methods released to date include four methods, for example, a Quality Attribute Workshop (QAW), an Attribute-Driven Design (ADD) method, an Architecture Tradeoff Analysis Method (ATAM), an Active Reviews for Intermediate Designs (ARID), and the like that have been researched and published in the Carnegie Mellon University Software Engineering Institute (CMU SEI) since the early 2000s. The four methods are based on the quality attribute, which needs to be satisfied by software when authoring an architecture of the software. Additionally, the four methods may define steps of a job required to maintain an association between requirements related to each quality attribute and a resultant obtained by authoring the architecture. However, considerable portions of the steps of the four methods overlap each other, and are generally defined regardless of a predetermined domain. Accordingly, the four methods merely provide what job needs to be performed in each step, and do not provide a detailed guideline on how to perform a job.

SUMMARY

The foregoing and/or other aspects are achieved by providing a method of transforming a single-core based architecture to a multi-core based architecture, the method including storing a functional requirement and a non-functional requirement of a software architecture, the functional requirement and the non-functional requirement being elicited based on a single-core based legacy source code, storing alternative architectures, determining an optimal alternative architecture based on a quality attribute among the alternative architectures, and authoring the optimal alternative architecture, the alternative architectures being generated based on the functional requirement and the non-functional requirement, determining a component corresponding to the authored alternative architecture, and instantiating the authored alternative architecture, and performing a quantitative evaluation with respect to the authored alternative architecture, to determine whether a performance of a system is improved in proportion to a number of multi-cores.

The storing of the functional requirement and the non-functional requirement may include analyzing a source code of a single-core based legacy system, classifying functions of the system by applying an activity diagram to a result of the analyzing, generating a use case specification based on an order of events related to an operation of performing the classified functions, extracting the non-functional requirement of the software architecture using a quality attribute scenario, receiving an input of constraints restricting implementation of the classified functions, generating a software requirement specification based on the classified functions, the non-functional requirement, and the constraints, and storing the software requirement specification.

The analyzing of the source code may include extracting a function description, a data structure, and a call relationship from the source code of the single-core based legacy system, and generating a source code analysis report.

The classifying of the functions of the system may include converting contents of the source code analysis report into a visible form using an activity diagram of a Unified Modeling Language (UML), and generating a system activity diagram.

The generating of the use case specification may include generating a use case specification based on the system activity diagram, by reflecting a parallelism on each step of a use case, the parallelism indicating whether an activity is executable in parallel in a plurality of processors.

The parallelism may include an activity where a plurality of functions are executable in parallel in the plurality of processors, and an activity where domain data is divided and the same function is executable in parallel in the plurality of processors.

The constraints may include factors restricting either a selection of an architectural pattern or a technical implementation of each component during the authoring of the optimal alternative architecture.

The generating of the software requirement specification may include generating a software requirement specification based on the use case specification, the quality attribute scenario, and the constraints.

The authoring of the optimal alternative architecture may include generating a single-core based reference architecture based on a system activity diagram, acquiring at least one applicable architectural pattern using an architectural decision supporter, generating alternative architectures, based on a software requirement specification, the single-core based reference architecture, and the at least one applicable architectural pattern, and determining an optimal alternative architecture among the alternative architectures, through a tradeoff analysis.

The generating of the single-core based reference architecture may include comparing activities identified in the system activity diagram with an existing source code structure, and identifying activities to be included together in a single component, mapping concurrent components to corresponding physical components, using the single component as a concurrent component, and comparing the concurrent components with an operation order of a system, and generating a static architecture and a dynamic architecture.

The acquiring of the architectural pattern may include acquiring the at least one applicable architectural pattern from the architectural decision supporter, based on an architectural driver, the architectural decision supporter being an Architectural Knowledge (AK) manager including the architectural driver, and the at least one applicable architectural pattern.

The generating of the alternative architectures may include generating the alternative architectures, based on a correlation between an architectural driver and the at least one applicable architectural pattern, a checklist used to select the at least one applicable architectural pattern, and the constraints.

The determining of the optimal alternative architecture may include generating a quality attribute tree where a priority is reflected based on a performance-related scenario among quality attribute scenarios, and determining an optimal alternative architecture through the trade-off analysis, based on a development priority of a scenario assigned to the quality attribute tree, wherein the quality attribute tree is divided into a quality attribute, a quality concern, and a quality attribute scenario in sequence.

The determining of the component may include searching for components using an architectural decision supporter, determining a component corresponding to the authored alternative architecture, among the found components, and modifying the determined component in a form suitable for a multi-core based architecture.

The searching of the components may include searching for, through the architectural decision supporter, a component already developed among components on an architecture, by using a name of a component or a function of a component as a keyword.

The determining of the component may include determining a physical component among the found components, based on reference data supported by the architectural decision supporter, the physical component performing a role of a component identified on the authored alternative architecture.

The performing of the quantitative evaluation may include generating a prototype for evaluating the authored alternative architecture, and evaluating the authored alternative architecture for each performance factor based on the prototype.

The generating of the prototype may include generating a system prototype having a quantitatively measurable performance, based on the authored alternative architecture and a code developed based on a single core.

The evaluating of the authored alternative architecture may include measuring evaluation results based on a criterion for measuring a response among quality attribute scenarios, and quantitatively evaluating the authored alternative architecture based on an acceptance range.

The foregoing and/or other aspects are achieved by providing a method of determining a multimedia architectural pattern to transform a single-core based architecture to a multi-core based architecture, the method including receiving an input of architectural drivers including an execution time/speed, a memory demand, a memory bandwidth, and load balancing needs, determining priorities of the architectural drivers based on a functional requirement and a non-functional requirement of a software architecture, and determining at least one architectural pattern from a mapping table, based on the determined priorities, wherein the mapping table may include concurrency-related architectural patterns and the architectural drivers, and the concurrency-related architectural patterns and the priorities of the architectural drivers are mapped to each other based on a checklist.

The determining of the at least one architectural pattern may include determining, as a recommended pattern, an architectural pattern matched to the determined priorities of the architectural drivers, and determining, as a partially adaptable pattern, an architectural pattern partially matched to the determined priorities of the architectural drivers.

The foregoing and/or other aspects are achieved by providing an apparatus for transforming a single-core based architecture to a multi-core based architecture, the apparatus including an input unit to receive an input of a single-core based legacy source code, an extraction unit to extract a functional requirement and a non-functional requirement of a software architecture, based on the single-core based legacy source code, a first processor to generate alternative architectures based on the functional requirement and the non-functional requirement, and to determine at least one optimal alternative architecture based on a quality attribute, among the alternative architectures, a second processor to determine a component corresponding to the at least one optimal alternative architecture, to instantiate the at least one optimal alternative architecture, and to perform quantitative evaluation with respect to the at least one optimal alternative architecture to determine whether a performance of a system is improved in proportion to a number of multi-cores, an output unit to output the at least one optimal alternative architecture where the quantitative evaluation is performed, and a storage unit to store the functional requirement, the non-functional requirement, the quality attribute, the alternative architectures, and an architectural decision supporter.

Additional aspects, features, and/or advantages of example embodiments will be set forth in part in the description which follows and, in part, will be apparent from the description, or may be learned by practice of the disclosure.

It is possible to perform an architecture authoring operation by using an architectural decision supporter, without prior knowledge and accumulated knowledge regarding a software architecture.

Additionally, it is possible to prevent an error from occurring during authoring of an architecture, by using a concurrency-related software architectural pattern that is already evaluated. Thus, it is possible to improve overall quality of software, and to reduce a development time.

Furthermore, it is possible to continue to reuse knowledge associated with authoring of an architecture, by storing architecture-related knowledge in a storage, and by enabling an access to the stored architecture-related knowledge.

Moreover, it is possible to transform a single-core based architecture to a multi-core based architecture, regardless of a type of embedded software applications, using a method of transforming a single-core based architecture to a multi-core based architecture.

BRIEF DESCRIPTION OF THE DRAWINGS

These and/or other aspects and advantages will become apparent and more readily appreciated from the following description of the example embodiments, taken in conjunction with the accompanying drawings of which:

FIGS. 17 to 19 illustrate diagrams of a software asset according to example embodiments;

DETAILED DESCRIPTION

Figure 1:
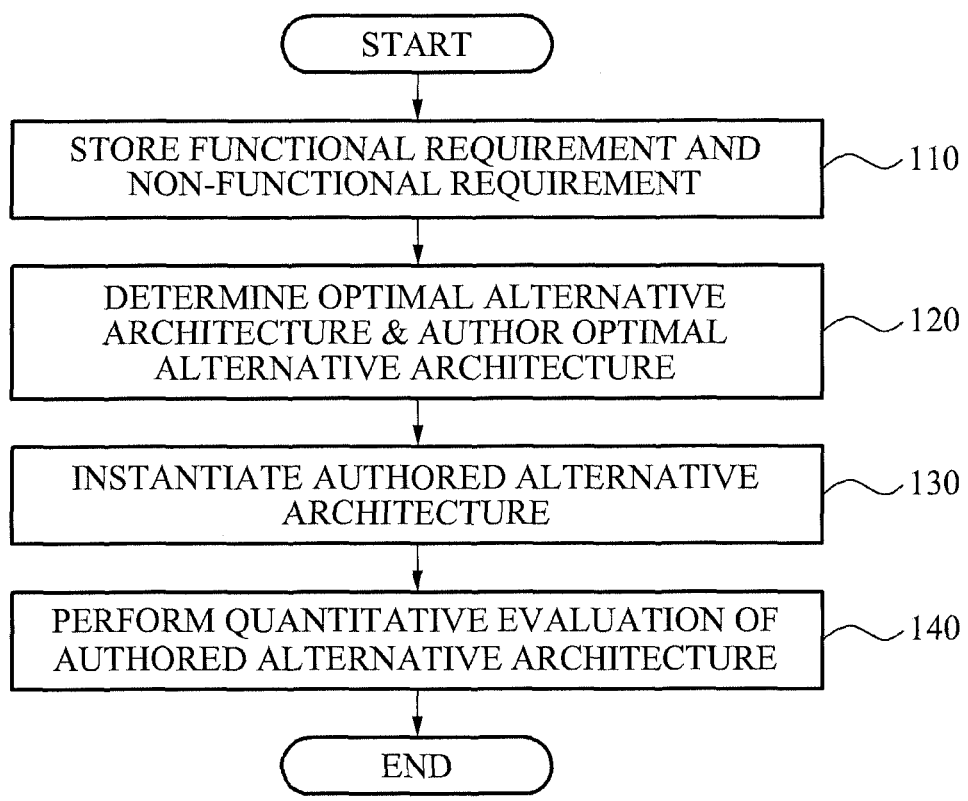
FIG. 1 illustrates a flowchart of a method of transforming a single-core based architecture to a multi-core based architecture according to example embodiments.

Reference will now be made in detail to example embodiments, examples of which are illustrated in the accompanying drawings, wherein like reference numerals refer to the like elements throughout. Example embodiments are described below to explain the present disclosure by referring to the figures.

A method of transforming a single-core based architecture to a multi-core based architecture according to example embodiments includes a method for authoring an architecture used to transform a single-core based embedded software application to a multi-core based embedded software application. The method of transforming a single-core based architecture to a multi-core based architecture may be applied regardless of a type of embedded software application, however, an application loaded in a compact portable mobile device, such as, a mobile phone, an MPEG Audio Layer-3 (MP3) device, a Personal Digital Assistant (PDA), and the like may be applied.

Additionally, the method of transforming a single-core based architecture to a multi-core based architecture may include analyzing requirements used to develop multi-core based software, establishing an architecture, and evaluating the established architecture, in view of entire development period of software.

Most embedded software development organizations employ an implementation code based development process, instead of a model based software development process. However, since universal processes, such as Quality Attribute Workshops (QAWs) or Attribute-Driven Designs (ADDS), propose a method of collecting initial data for authoring an architecture from business drivers, a large number of overheads may occur when an architecture is authored based on steps of the QAW or the ADD without separately performing a customizing operation. Accordingly, the method of transforming a single-core based architecture to a multi-core based architecture may be a process customized to transform a single core to multi-cores, and may be initiated from legacy source code of a single core that already exists.

In an existing architecture evaluation method, such as an Architecture Tradeoff Analysis Method (ATAM) or an Active Reviews for Intermediate Designs (ARID), whether authored architecture is suitable for a given quality requirement is normally analyzed by inferring the requirement. However, transformation of a single-core based architecture to a multi-core based architecture may be performed with a single clear purpose to improve the performance of a product in proportion to the number of cores. Accordingly, there is a desire for an architecture evaluation process of quantitatively measuring the performance of a product.

Thus, the method of transforming a single-core based architecture to a multi-core based architecture may be performed by a prototyping operation of assigning processes to each core based on a proposed architecture, prior to completion of final evaluation of the architecture. In this instance, the performance may be quantitatively measured, and whether a result obtained by quantitatively measuring the performance satisfies a target range of a performance requirement when authoring of the architecture is started may be evaluated.

FIG. 1 illustrates a flowchart of a method of transforming a single-core based architecture to a multi-core based architecture according to example embodiments.

In operation 110, an architecture transformation apparatus for transforming a single-core based architecture to a multi-core based architecture according to example embodiments may extract a functional requirement and a non-functional requirement of a software architecture, and may store the extracted functional requirement and the extracted non-functional requirement. In this case, the functional requirement and the non-functional requirement may be elicited using a single-core based legacy source code, and may be used for transformation to a multi-core based architecture. A method of eliciting the functional requirement and the non-functional requirement, and a method of storing the result of the eliciting will be further described with reference to FIGS. 2 to 4.

In operation 120, the architecture transformation apparatus may generate alternative architectures, and may store the generated alternative architectures. Additionally, the architecture transformation apparatus may determine an optimal alternative architecture, among the alternative architectures, and may author the determined alternative architecture. The alternative architectures may be generated based on the functional requirement and the non-functional requirement. The optimal alternative architecture may be determined based on a quality attribute. A method of generating the alternative architectures, and a method of determining the optimal alternative architecture will be further described with reference to FIGS. 5 to 15.

In operation 130, the architecture transformation apparatus may instantiate the authored alternative architecture. Operation 130 may be initiated by determining a component corresponding to the authored alternative architecture. Operation 130 will be further described with reference to FIGS. 16 to 19.

In operation 140, the architecture transformation apparatus may perform quantitative evaluation with respect to the authored alternative architecture. The quantitative evaluation may be performed with respect to the authored alternative architecture by determining whether the performance of a system is improved in proportion to a number of multi-cores.

Figure 2:
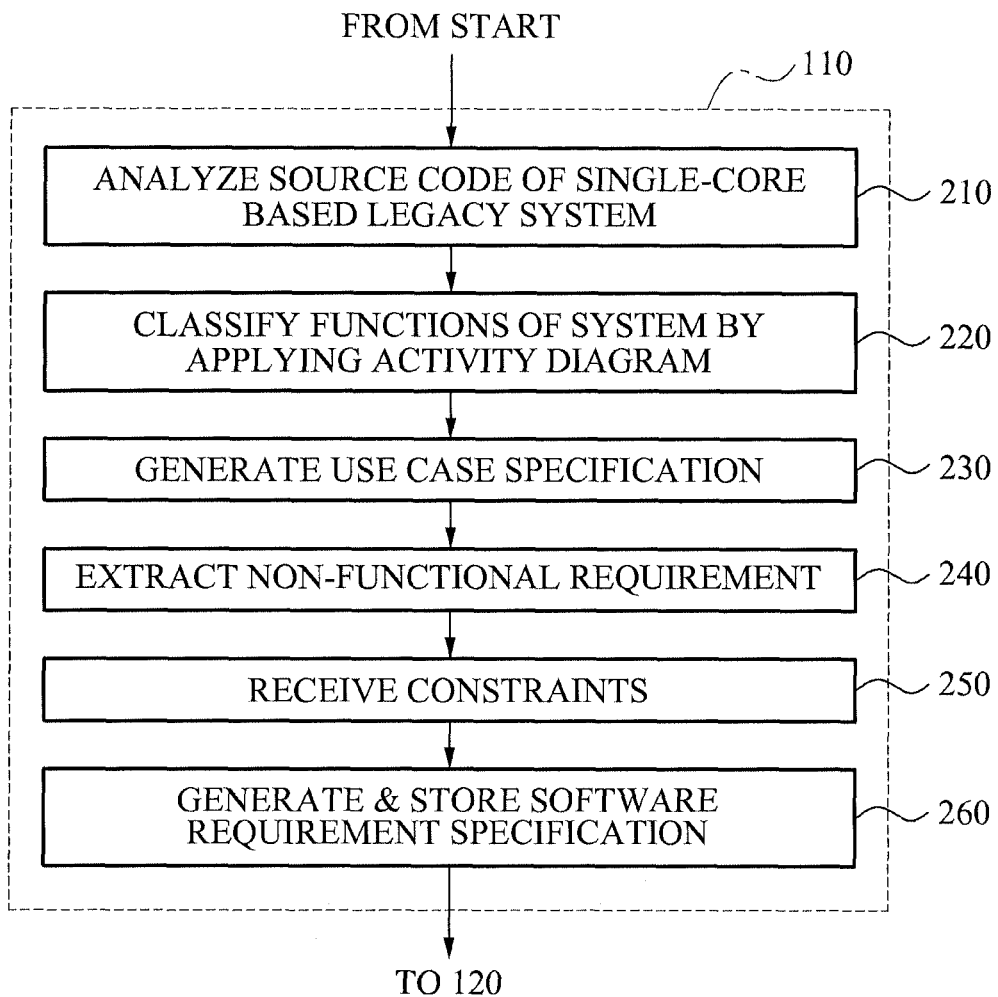
FIG. 2 illustrates a detailed flowchart of an operation of storing requirements of a software architecture in the method of FIG. 1.

FIG. 2 illustrates a detailed flowchart of operation 110 of FIG. 1.

In operation 210, the architecture transformation apparatus may analyze a source code of a single-core based legacy system. The architecture transformation apparatus may analyze the source code of the single-core based legacy system based on a reference input from a user. The single-core based legacy system may refer to a general system generated for a single core, and may include, for example, an H.264 video decoder system. Operation 210 may be performed by classifying the source code according to a function description, a data structure, and a call relationship.

Additionally, the architecture transformation apparatus may generate a source code analysis report, by classifying the source code according to the function description, the data structure and the call relationship. The source code may be analyzed based on the source code analysis report. In addition, the source code may be analyzed in a processor of a predetermined system, realized in a program command form executable by a computer means, and recorded in a computer-readable medium.

In operation 220, the architecture transformation apparatus may visibly classify functions of the system by applying an activity diagram to a result of the analyzing. In this instance, the activity diagram refers to a flowchart illustrating a workflow that shows activities in the system and the flow of control between the activities. The activities may refer to various operations of performing the functions of the system.

Contents of the source code analysis report may be converted into a visible form, using an activity diagram of a Unified Modeling Language (UML). The activity diagram may be referred to as a system activity diagram. Activities of the system may be identified as several meaningful phases through the system activity diagram.

In operation 230, the architecture transformation apparatus may generate a use case specification, based on the order of events related to an operation of performing the classified functions. The order of the events may be determined by setting operations of the system based on the flow of time. Additionally, the use case specification may also be generated based on a criterion input from a user.

The architecture transformation apparatus may display whether parallelism is applicable to each step of a use case, as an additional requirement for transformation to a multi-core based architecture. The parallelism may indicate whether an activity performed in each step is executable in parallel in a plurality of processors. Table 1 shows an example system in which parallelism is applicable in a decoding use case of a video decoder.

TABLE 1

| BF3 | Start Entropy Decoding | FP_01 |
|---|---|---|
| | ----------- ... --------------- | |
| BF4 | Start Transform (Transform Module) | FP_01 |
| | ----------- ... --------------- | |
| BF5 | Start Prediction (Prediction Module) | FP_01 |
| | ----------- ... --------------- | |
| BF6 | Perform Deblocking (Deblocking Filter Module) | FP_01 |
| BF6.1 | DeblockAreaFetch—Copy data from SrcY, SrcU, and SrcV to DeblockUnit (FN05-CN52) | DP_03 |
| BF6.2re | Progress deblocking by input of data of Deblock (FN08-CN53) | DP_03 |

In Table 1, "FP_01" represents an example in which functions among several activities are executable in parallel. Additionally, numerals next to "FP_" represent implementation of functional parallelism among activities in the same step. Basic Flow (BF) steps 3, 4, 5, and 6 may be realized by functional parallelism, and may refer to activities that may be performed in parallel.

"DP_03" represents an example in which domain data is appropriately divided and the same function is executable in parallel. Numerals next to "DP_" represent implementation of data parallelism among activities in the same step.

Referring to Table 1, an operation of performing functions of a system may be classified into an entropy decoding operation, a transform operation, a prediction operation, and a deblocking operation. Each of the operations may be executed in parallel in various processors. Also, detailed operations BF6.1 and BF6.2 for the deblocking operation may be executed in parallel in various processors.

Table 2 shows all configurations of a specification of a decoding use case of a video decoder in an example system, and contents corresponding to each of the configurations.

TABLE 2

| Requirement ID | Video decoding based on H.264 | |
|---|---|---|
| Description | Operations of system where video decoder operated based on an H.264 protocol decompresses input video data and displays decompressed video data on screen are described. | |
| Pre-condition | Input video data is loaded in DRAM | Parallelism |
| Post-condition | Outputting of input video data to output buffer is completed | |
| Development priority | 1 | |
| Basic operations | BF1 | Decoding message is arrived to video decoder. | N |
| | BF2 | Start input data processing | N |
| | BF2.1 | Initialize remained_file_size, and bitstream_pos. (FN01-CN01) | N |

TABLE 2-continued

| | | |
|---|---|---|
| BF2.2 | Copy data from bitstream_pos[ ] to FileBuffer[HALF_BUFFER_SIZE] by HALF_BUFFER_SIZE | N |
| BF2.3 | Set stream_byte_start_pos (byte unit data start index of FileBuffer[ ]). (FN01-CN02) | N |
| BF2.4 | Change stream_byte_start_pos after copying data to FileBuffer[HALF_BUFFER_SIZE] by HALF_BUFFER_SIZE | N |
| BF2.5 | Set next_start_pos (next start data index in FileBuffer[ ]). (FN01-CN03) | N |
| BF2.6 | Set LongStreamBitStartPos, and BitstreamBufferPtr. (FN01-CN04) | N |
| BF2.7 | Parse BitstreamBufferLong[ ] Perform divergence to BF3, if NAL Header Type is not available. | N |
| BF2.7.1 | [NAL Header Type == Slice Data, Decoding Reset] Extract and store slice-related information. (FN02-CN08,CN09) | N |
| BF2.7.1.1 | [iEndofFrame == 1] Return to BF2.4 step. | N |
| BF2.7.1.2 | [iEndofFrame !== 1] Start image restoration, and return to BF2.8. (FN01-CN08) | N |
| BF2.7.2 | [NAL Header Type == SPS] Store sequence-related information in seq_parameter_set. (CN06) | N |
| BF2.7.3 | [NAL Header Type == PPS] Store picture-related information in pic_parameter_set. (CN07) | N |
| BF2.8 | Analyze syntax. Perform divergence to EF1, if input is not matched to Syntax. | N |
| BF3 | Start Entropy Decoding. | FP_01 |
| BF3.1 | Start MacroBlock(MB) Type Decoding (FN03-CN10). | DP_01 |
| BF3.1.1 | [MB type == Intra-Picture 4×4] Start Intra Prediction. | DP_01 |
| BF3.1.2 | Parse I_4×4 pixel (FN04-CN11) | DP_01 |
| BF3.1.3 | Set CodedBlockPatternChroma, currMB->c_ipred_mode, and currMB->i16mode.(FN04-CN11) | DP_01 |
| BF3.1.4 | Perform IntraPredDataFetch. (FN05-CN12) | DP_01 |
| BF3.2.1 | [MB type == Predictive-Picture] Start Inter-Predection. | DP_01 |
| BF3.2.1.1 | [MB Type == p_16×16] p_16×16 pixel Processing: Generate value in psMv0X, Y. (FN03-CN13) | DP_01 |
| BF3.2.1.2 | Extract Motion vector, and store the extracted motion vector in gp_ref_idx[ ], and g_current_pic_mv[ ]. (FN03-CN14) | DP_01 |
| BF3.2.1.3 | Copy Image data of listX to currMB->RefArea. (FN05-CN15) | DP_01 |
| BF3.2.2.1 | [MB type == P_8×8 or P_8×8ref] P_8×8 or P_8×8ref pixel processing: Generate value in psMv0X, Y. (FN04-CN16) | DP_01 |
| BF3.2.2.1.1 | [Avail] MV8×8_Avail: Set calculated Motion vector value. (FN04-CN17) | DP_01 |
| BF3.2.2.1.2 | [notAvail] MV8×8_notAvail: Set calculated Motion vector value. (CN18) | DP_01 |
| BF3.2.2.2 | Copy image data of listX to currMB->RefArea. (FN05-CN19) | DP_01 |
| BF3.2.3.1 | [MB type == P_16×8 or P_8×1] Process P_16×8 or P_8×16 pixel. (FN04-CN20) | DP_01 |
| BF3.2.3.1.1 | [MotionVector(MV) == 8×16] Process P_8×16. (FN04-CH23,FN05-CN24) | DP_01 |
| BF3.2.3.1.2 | [MotionVector(MV) == 16×8] Process P_16×8. (FN04-CN21,FN05-22) | DP_01 |
| BF3.3 | Set values of currMB->QP and currMB->QPC. | N |
| BF3.4 | Parse coefficient value. (FN03-CN25,CN26) | N |
| BF4 | Start Transform. (Transform Module) | FP_01 |

TABLE 2-continued

|   |   |   |   |
|---|---|---|---|
| | BF4.1 | Extract currMB->QPC, currMB->QP, and currMB->CBP value. | DP_02 |
| | BF4.2 | Perform Dequantization and inverse transform. | DP_02 |
| | BF4.3 | Store in currMB->MBBuffer. | DP_02 |
| | BF5 | Start Prediction. (Prediction Module) | FP_01 |
| | BF5.1 | Check currMB->iMB_type value. | DP_03 |
| | BF5.1.1 | [currMB->iMB_type == P_16×16 or P_16×8 or P_8×16 or P_8×8 or P_8×8ref] Calculate value of currMB->MBBuffer based on values of Mv_x[ ], Mv_y[ ], currMB->RefAreaY for each type. (FN09-CN56) | DP_03 |
| | BF5.1.2 | [currMB->iMB_type == I_4×4] Copy data from region of urrMB->MBBuffer to current region based on value of cg_ipredmode. (FN07-CN30-CN41) | DP_03 |
| | BF5.1.3 | [currMB->iMB_type == I_16×16] Copy value of currMB->MBBuffer from region of another slice based on value of currMB->i16mode. (FN07-CN57~60) | DP_03 |
| | BF5.2 | Check whether Flexible Macroblock Ordering (FMO). | N |
| | BF5.2.1 | [Non-FMO] Process NonFMO. (FN02-CN50) | N |
| | BF5.2.2 | [FMO] Process FMO. (FN02-CN51) | N |
| | BF5.3 | Set currMB->MbInxX,Y. | N |
| | BF6 | Perform Deblocking. (Deblocking Filter Module) | FP_01 |
| | BF6.1 | DeblockAreaFetch—Copy data from SrcY, SrcU, and SrcV to DeblockUnit. (FN05-CN52) | DP_04 |
| | BF6.2 | Progress deblocking by input of data of Deblock. (FN08-CN53) | DP_04 |
| | BF6.3 | Initialize currMB->MbIdxX,Y and various data structure (g_current_pic_mv[ ], gp_ref_idx[ ]). (FN02-CN54) | N |
| | BF6.4 | Add new output buffer to tail of output buffer list. (FN020-CN55) | N |
| | BF6.5 | Output corresponding output buffer on screen. (FN020-CN55) | N |
| Alternative operation | AF1 | Not applicable | |
| Exceptional operation | EF1 | Output error message and terminate program, if input is not matted to Syntax in BF2.8 | |
| | EF2 | Output error message and terminate program, if input data address of currMB->MBBuffer is wrong between BF5.1.1 and BF5.1.3 | |
| | EF3 | Move buffer point to next_start_pos and re-execute buffer point in BF2.7, if NAL Header Type is not available in BF2.7 | |
| Quality requirement | QR1 | Not applicable | |

Table 2 shows whether parallelism is applicable, in the same manner as Table 1. In Table 2, "N" represents an activity that may not be executed in parallel. Additionally, "FP" and "DP" may be used to identify activities that are executable in parallel in a plurality of processors in each step. The architecture transformation apparatus may extract activities where the parallelism is applied, and may extract a functional requirement of a system.

In operation 240, the architecture transformation apparatus may extract the non-functional requirement of the architecture, using a quality attribute scenario. In this instance, a form of the quality attribute scenario may be identical to forms proposed by the QAW, the ATAM, the ARID, and the like.

The quality attribute scenario may include, as items, a category, a source, a stimulus, an environment, an artifact, a response, and a response measure.

The category indicates which quality attribute category of software includes requirements for transforming a single-core based architecture to a multi-core based architecture. Generally, various categories such as performance, security, scalability, usability, and the like may be applied. However, since the category is specific for a context such as transformation of a single core to multi-cores, the category may be narrowed down to performance.

The source refers to a source of a stimulus applied to a system. In the case of transforming a single-core based architecture to a multi-core based architecture, the source may be expressed as a hardware configuration.

The stimulus indicates what an event applied to the system occurs. In the case of transforming a single-core based architecture to a multi-core based architecture, the stimulus may be expressed as a change in a number of cores.

The environment indicates a condition enabling a system to respond to an input stimulus. In the case of transforming a single-core based architecture to a multi-core based architecture, a response may occur based on a change in a number of cores in a general environment, without a special condition.

The artifact indicates the target of a response of a system. In the case of transforming a single-core based architecture to a multi-core based architecture, the system itself may be a target of a response.

The response indicates a response form of a system responding to an input stimulus. In the case of transforming a single-core based architecture to a multi-core based architecture, a performance may be measured through a response of a system power.

The response measure indicates a reference or a method for measuring a response of a system with respect to an input stimulus. In the case of transforming a single-core based architecture to a multi-core based architecture, performance may be evaluated based on an operating frequency (Hz) of a system power.

Table 3 shows an example of a quality attribute scenario in a video decoder.

TABLE 3

| Requirement-ID | NFR_01 |
|---|---|
| Category | Performance |
| Source | Hardware configuration |
| Stimulus | Change in number of cores |
| Environment | Normal Operation |
| Artifacts | System |
| Response | System power |
| Response Measure | System operating frequency (Hz) |
| Development priority | 1 |
| Description | When a single-core system is transformed to a system supporting four cores, a frequency (Hz) of 35% needs to be outputted by a power consumed to perform a normal operation, compared to the single-core system. |

In Table 3, "description" indicates a response form set as a target for a detailed stimulus. In other words, when a single-core based architecture is transformed to a multi-core based architecture, measurement of performance as a non-functional requirement may be performed by measuring an operation frequency (Hz) of a system.

In operation 250, the architecture transformation apparatus may receive an input of constraints restricting implementation of the classified functions.

The constraints may include elements restricting either a selection of an architectural pattern or a technical implementation of each component during the authoring of the architecture. Each component may be restricted in implementation on hardware, or may be legally restricted in implementation. Technical and legal constraints may be stored in a database in advance. The architecture transformation apparatus may read the technical and legal constraints from the database.

For example, a constraint that a maximum number of physical cores is limited to 4 may be generated, by loading an example system in an ARM-SRP. Additionally, a (Color Graphic Adaptor, CGA)/Dual Mode may be supported and accordingly, data parallelism such as Single Instruction Multiple Data (SIMD) belonging to a concurrent execution category may be supported on hardware. Setting of a number of physical cores in an architecture to be "8," given the constraint that the maximum number of physical cores is limited to 4, may be regarded as an error.

In operation 260, the architecture transformation apparatus may generate a software requirement specification based on the classified functions, the non-functional requirement, and the constraints, and may store the software requirement specification. In other words, the software requirement specification may be generated by reflecting a functional requirement and a non-functional requirement that are required to transform a single-core based architecture to a multi-core based architecture. The functional requirement may be extracted from the use case specification, and the non-functional requirement may be extracted based on the quality attribute scenario.

Figure 3:
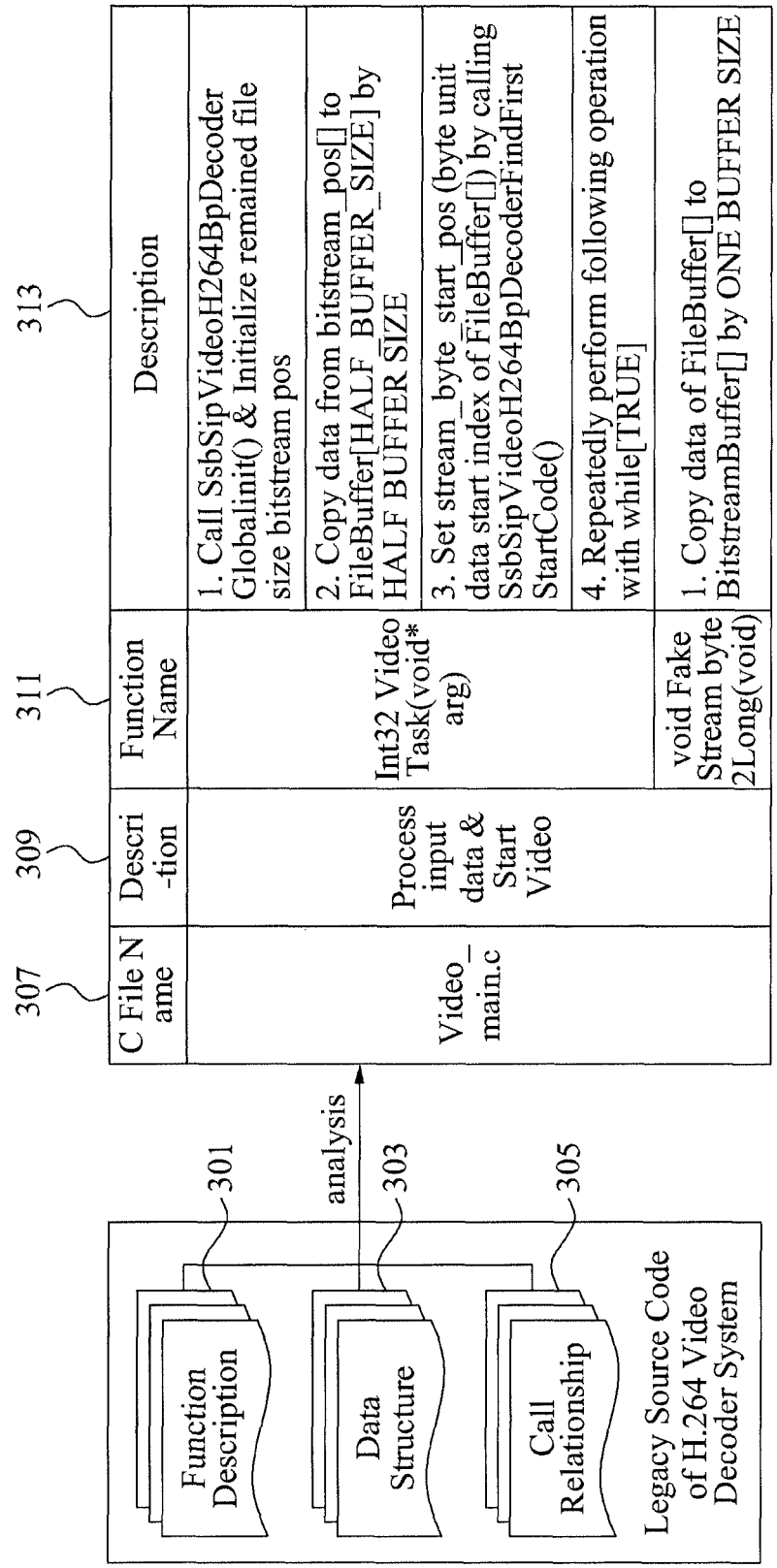
FIG. 3 illustrates a diagram of an example of a source code analysis according to example embodiments.

FIG. 3 illustrates an example of a source code analysis according to example embodiments.

Specifically, FIG. 3 illustrates an example of analyzing a legacy source code of an H.264 video decoder system.

The architecture transformation apparatus may extract a function description 301, a data structure 303, a call relationship 305, and the like from the source code, and may generate a source code analysis report. Since a video decoder as an example system is implemented in C language, a C file name 307, a description 309 of a corresponding file, a function name 311 of a function implemented in the corresponding file, and an implementation logic 313 in the function are described in the source code analysis report. The contents of the source code analysis report may be changed based on an implementation language. In this case, internal logics for identifying activities of a system need to be described.

Figure 4:
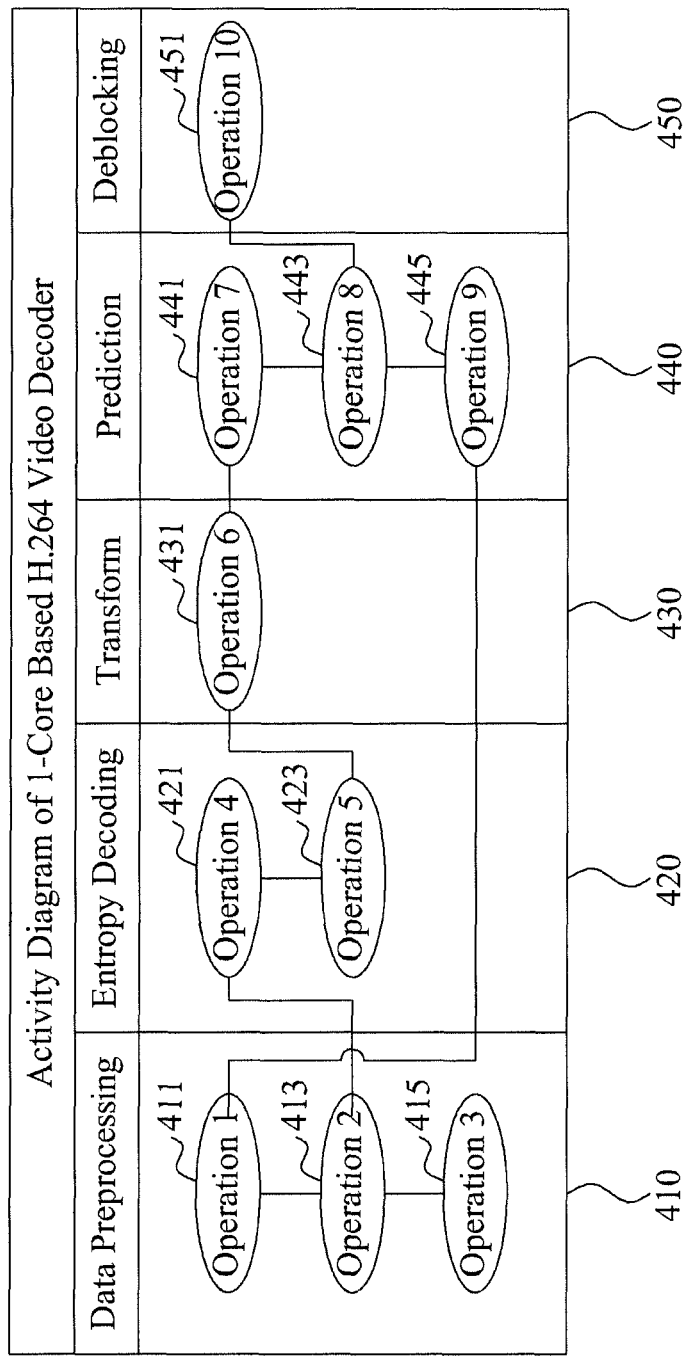
FIG. 4 illustrates a diagram of an example of applying an activity diagram according to example embodiments.

FIG. 4 illustrates an example of applying an activity diagram according to example embodiments. Specifically, FIG. 4 illustrates an operation of an H.264 video decoder system using an activity diagram.

The contents of the source code analysis report may be converted into a visible form using an activity diagram of a UML. The visible form may enable activities of a system to be easily identified as several meaningful phases. Here, the phases may be utilized as meaningful resources when a single system is divided into a plurality of components during authoring of an architecture. Additionally, a connection relationship between the phases may be clearly verified.

Referring to FIG. 4, the H.264 video decoder system may be identified as five phases, for example, a data preprocessing phase 410, an entropy decoding phase 420, a transform phase 430, a prediction phase 440, and a deblocking phase 450.

The data preprocessing phase 410 may be performed through an operation 1 411, an operation 2 413, and an operation 3 415. For example, the operation 1 411 may refer to an operation of initializing a data structure buffer for storing macro block information.

The entropy decoding phase 420 may be performed through an operation 4 421, and an operation 5 423. In this instance, the operation 4 421 may be started based on a result of the operation 2 413. For example, the operation 2 413 may refer to starting of an image restoration for macro blocks forming a slice. The operation 4 421 may refer to an operation of loading information of a macro block to be processed, from a Sequence Parameter Set (SPS) buffer, a Picture Parameter Set (PPS) buffer, and an Instantaneous Decoding Refresh (IDR) buffer.

The transform phase 430 may be performed through an operation 6 431. For example, the operation 6 431 may refer to an operation of loading information of a reference macro block and image data, and calculating an error between a restoration macro block and a reference macro block using a quantization and inverse transform.

The prediction phase 440 may be performed through an operation 7 441, an operation 8 443, and an operation 9 445. For example, the operation 7 441 may refer to an operation of loading type information of a macro block to be restored, and of parsing the loaded type information.

The deblocking phase 450 may be performed through an operation 10 451. For example, the operation 10 451 may refer to an operation of checking a blocking phenomenon, namely, an error occurring when restoring data.

Figure 5:
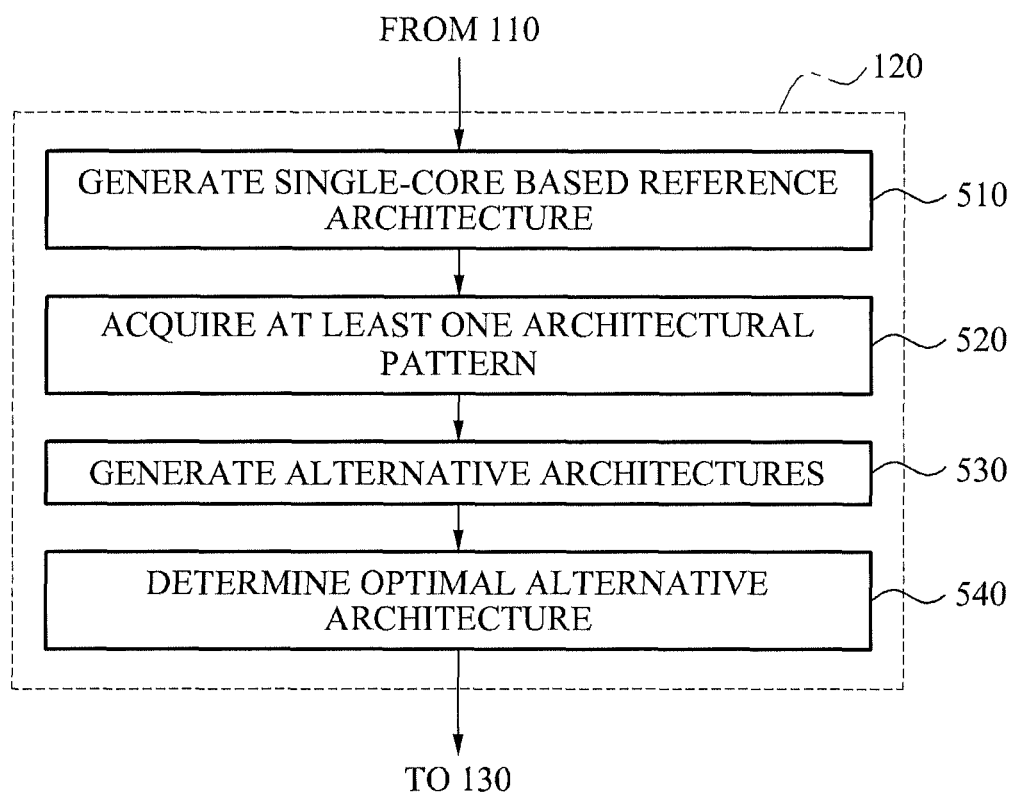
FIG. 5 illustrates a detailed flowchart of an operation of authoring an alternative architecture in the method of FIG. 1.

FIG. 5 illustrates a detailed flowchart of operation 120 of FIG. 1.

In operation 510, the architecture transformation apparatus may generate a single-core based reference architecture, based on a system activity diagram.

The architecture transformation apparatus may compare activities identified in the system activity diagram with an existing source code structure. As a result of the comparing, the architecture transformation apparatus may identify activities to be included together in a single component, and may map concurrent components to corresponding physical components by using the single component as a concurrent component.

In this instance, the concurrent component may refer to a phase identified in the system, and the physical component may refer to a source code file. The architecture transformation apparatus may arrange the concurrent components in an operation order of the system, and may generate a reference architecture. The reference architecture may include a static architecture and a dynamic architecture. The static architecture may represent a connection relationship between concurrent components, and operations needing to be performed by each of the concurrent components. The dynamic architecture may represent how the concurrent components of the static architecture cooperate with each other.

In operation 520, the architecture transformation apparatus may acquire at least one applicable architectural pattern using an architectural decision supporter.

The architectural decision supporter may support applicable architectural patterns based on priorities of architectural drivers. Here, a result of mapping the priorities of the architectural drivers to the architectural patterns may be stored in a database. A mapping rule for mapping the priorities of the architectural drivers to the architectural patterns will be further described with reference to FIG. 21.

The architectural driver may refer to a decisive parameter used to author an architecture required by a user. During transforming of a single-core based architecture to a multi-core based architecture, four parameters for determining an architecture may be set. The four parameters may include, for example, an execution time/speed, a memory demand, a memory bandwidth, and load balancing needs.

When priorities of the four parameters are determined by a user, the architecture transformation apparatus may acquire at least one architectural pattern matched to the priorities. Here, a plurality of architectural patterns may be matched to the priorities.

In operation 530, the architecture transformation apparatus may generate alternative architectures, based on a software requirement specification, the reference architecture, and the at least one architectural pattern.

Specifically, the architecture transformation apparatus may generate the alternative architectures, based on a correlation between an architectural driver and the at least one architectural pattern, a check list used to select the at least one architectural pattern, and the constraints. The correlation and the check list may be supported by the architectural decision supporter. The constraints may be extracted from the software requirement specification. The alternative architectures may be generated based on concurrent components forming the reference architecture. The alternative architectures may be generated in various forms using a heuristic method. Additionally, the alternative architectures may be generated in a form of a static architecture and a dynamic architecture, similar to a reference architecture.

In operation 540, the architecture transformation apparatus may determine an optimal alternative architecture among the alternative architectures, through a trade-off analysis.

The architecture transformation apparatus may generate a quality attribute tree where a priority is reflected, based on a performance-related scenario among quality attribute scenarios. Here, the quality attribute tree may be divided into a quality attribute, a quality concern, a quality attribute scenario, and a development priority of the quality attribute scenario, in sequence. Four architectural drivers may be reflected on the quality concern. The four architectural drivers may include, for example, an execution time/speed, a memory demand, a memory bandwidth, and load balancing needs.

The development priority of the quality attribute scenario may be determined based on difficulty and importance. The importance may indicate an influence of a corresponding scenario on a system success. The priority may be determined by setting a difficulty level and an importance level to be high (H), medium (M), and low (L). Additionally, the development priority of the quality attribute scenario may be set in advance. The development priority may be increased, as the importance is increased and as the difficulty is reduced. Conversely, the development priority may be reduced, as the importance is reduced and as the difficulty is increased. Table 4 shows a priority determined based on an importance and a difficulty in an example embodiment.

TABLE 4

| Importance | Difficulty | Priority |
|---|---|---|
| H | L | 1 |
| H | M | 2 |
| H | H | 3 |
| M | L | 4 |
| M | M | 5 |
| M | H | 6 |
| L | L | 7 |
| L | M | 8 |
| L | H | 9 |

The architecture transformation apparatus may perform the trade-off analysis based on a development priority of a scenario assigned to the quality attribute tree, and may determine an optimal alternative architecture based on a result of the analyzing.

The trade-off analysis may be performed based on a development priority of a scenario assigned to the quality attribute tree. The trade-off analysis may be performed by comparing pros and cons of each alternative architecture. Here, the cons may include latent risks expected when a corresponding alternative architecture is applied. The pros and cons of each alternative architecture for the quality attribute scenario may be set in advance, and stored in a database.

The pros and cons of each alternative architecture may be connected with quality attribute scenarios. The pros may mean that a corresponding alternative architecture acts as a positive factor in implementing a connected scenario in a system. Conversely, the cons may mean that that a corresponding alternative architecture acts as a negative factor in implementing a connected scenario in a system. Generally, an alternative architecture may not act as a positive factor in all scenarios. To determine an optimal alternative architecture, trade-off factors of individually identified alternative architectures may be analyzed and as a result, a single alternative architecture acting as a positive factor may be selected from among alternative architectures.

Typically, an Architectural Knowledge (AK) managed by an AK manager may be expressed, as given in the following equation:

AK=Design Decision+Design

The design decision may indicate what rationale is used for generation of a predetermined product, and most rationales may use a development requirement of software as a start point. Accordingly, managing of the design decision using the AK may refer to managing all of the data referred to by an architecture until a predetermined architecture is selected, and the data used to infer concepts connected in a head of an architecture. The above data may be expressed as contextual knowledge of an architecture.

In the academic world, experimental implements, such as an Architecture Design Decision Support System (ADDSS), an Archium, an Architecture Rationale and Element Linkage (AREL), The Knowledge architect, a PAKME, and the like have been published since the mid-2000s.

Knowledge for managing the experimental implements may include, for example, a trade-off, a design rule, a quality attribute, an architectural design pattern, a design tactic, and the like, and may be limited to several products associated with an architecture among by-products of various software developments.

However, when a decision related to an actual architecture is performed, it is difficult to determine a range and a type of product needed to be considered and referred to. For example, knowledge used to author an architecture may be associated with a legacy source code that is already developed, and may also be associated with a test of a component that is already developed. Additionally, an Application Program Interface (API) specification of hardware loaded in a software system may be used as reference data to determine an architecture. Accordingly, the contextual knowledge of the architecture may not be limited to only either a finite number of templates or several product forms.

To overcome limitations in expression and management of the contextual knowledge of the architecture, an AK manager according to example embodiments may be proposed. The AK manager may be used as a template for containing pieces of knowledge, and may support a Reusable Asset Specification (RAS) established based on a standard of a software asset specification in an Object Management Group (OMG).

It is possible to overcome the finitude of manageable knowledge through an AK expression process employing a meta model, by using the RAS as an implementation for expressing the AK. That is, it is possible to input, modify, delete, and inquire of all types of products related to software development in an implement.

Additionally, it is possible to support portability of the AK, by using the RAS as an implement for expressing the AK. For example, a portion of an architecture-related product that is described in a UML model form may be exported as a ".ras" file, and may be imported in a modeling implement such as an IBM Rational Software Architect, and thus connection to modeling may be performed without an overlapping operation.

Figure 6:
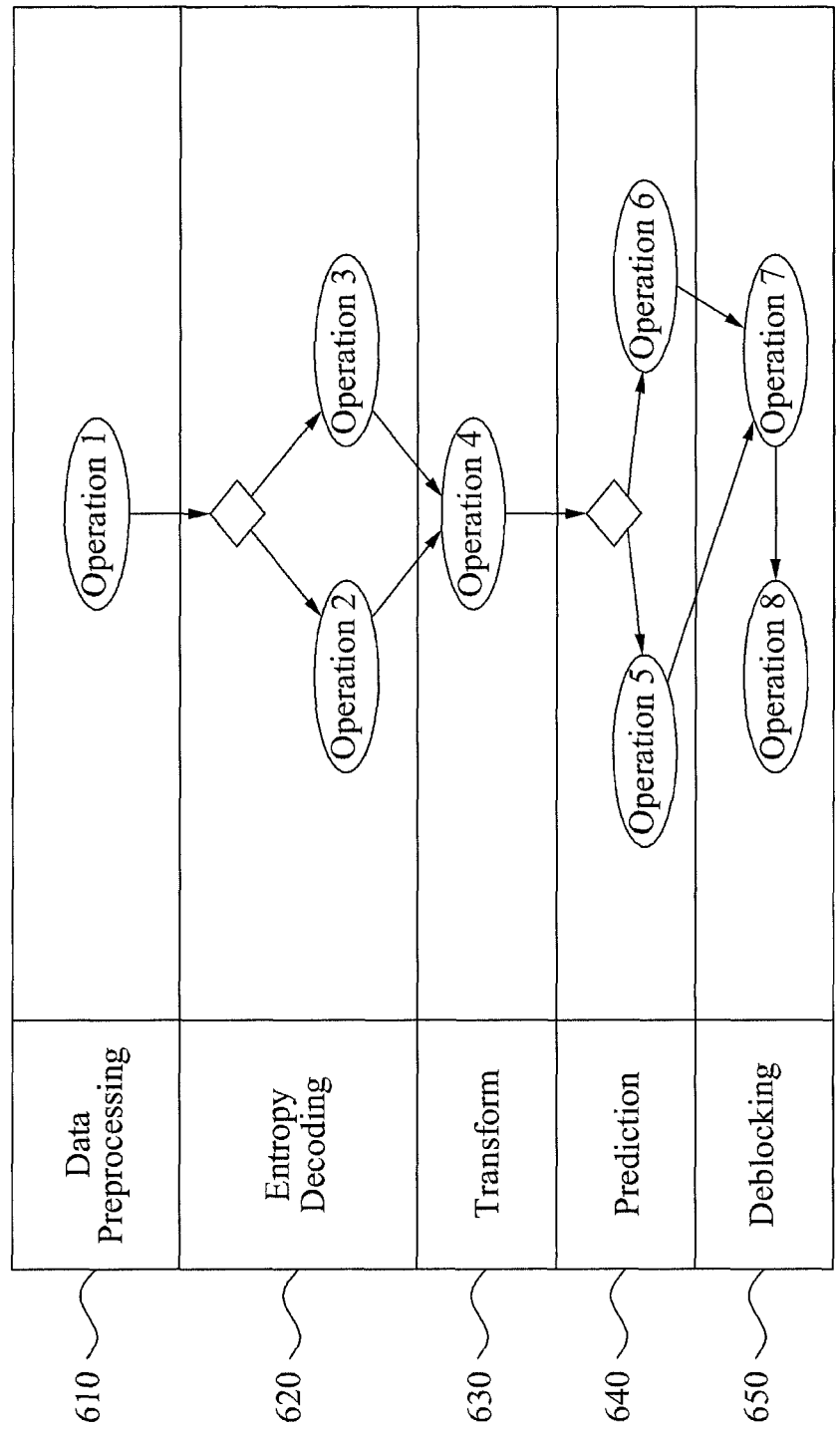
FIG. 6 illustrates a diagram of an example in which identified components are mapped to operations of a system according to example embodiments.

FIG. 6 illustrates a diagram of an example in which identified components are mapped to operations of a system according to example embodiments.

Referring to FIG. 6, operations identified in a system activity diagram may be mapped for each of the identified components. Here, the identified components may be components in view of concurrency, and may correspond to processes. In other words, the operations of the system that are already implemented in forms of functions or computations may be configured as a single process.

A data preprocessing component 610 may be mapped to an operation 1. For example, in a video decoding system, the operation 1 may include an operation of receiving an input of Network Abstraction Layer (NAL) data, and an operation of parsing a header type.

An entropy decoding component 620 may be mapped to an operation 2 and an operation 3. When a picture type corresponds to an intra mode, the operation 2 may include an operation of loading data of a macro block and calculating a pixel value that is advantageous in restoration. When a picture type corresponds to a prediction mode, the operation 3 may also include an operation of loading data of a macro block and calculating a pixel value that is advantageous in restoration.

A transform component 630 may be mapped to an operation 4. The operation 4 may include, for example, an operation of calculating an error between an original macro block and a macro block to be referred to for restoration.

A prediction component 640 may be mapped to an operation 5 and an operation 6. The operation 5 may include, for example, an operation of restoring a 4×4 image in an intra mode with respect to an error value. The operation 6 may include, for example, an operation of restoring a 16×16 image, a 16×8 image, an 8×16 image, and an 8×8 image in a prediction mode with respect to an error value.

A deblocking component 650 may be mapped to an operation 7 and an operation 8. The operation 7 may include, for example, an operation of storing a restored macro block image in a buffer. The operation 8 may include, for example, an operation of determining whether all corresponding buffers are used, and whether a current frame is the last frame.

A multi-core based system may perform functions provided by a single-core based system, without any change. In other words, since source codes operated based on the single-core based system may also be reused in a multi-core based architecture, a mapping relationship between a concurrent component and a physical component may be stored in a database. The physical component may refer to a source code file. In this instance, a single source code file may participate in configuring of at least two concurrent components.

Table 5 shows a mapping relationship between a concurrent component and a physical component that are identified in an example system. The concurrent component may be expressed as a process. As shown in Table 5, a "Prediction-Fetch.c" file may participate in both two processes, namely a macro block parser and a deblocker. In an example system, a large amount of data typically flows along a single pipeline, and accordingly, a process may be configured based on a data process phase identified in the activity diagram.

TABLE 5

| Process Phase | Process (Filter) | Physical Component (File) |
|---|---|---|
| Data Preprocessing | Data Preprocessor | Video_main.c DecoderTop.c |
| Entropy Decoding | Macro Block Parser | EntropyDecMB.c EntropyDecMB2.c PredictionFetch.c |
| Transform | Dequantizer | IDCTQ.c |
| Prediction | Macro Block Predictor | Prediction.c PredictionIntra.c DecoderTop.c |

TABLE 5-continued

| Process Phase | Process (Filter) | Physical Component (File) |
|---|---|---|
| Deblocking | Deblocker | PredictionFetch.c Deblock.c DecoderTop.c |
| Picture Management | Picture Manager | Picmanagement.c |

Figure 7:
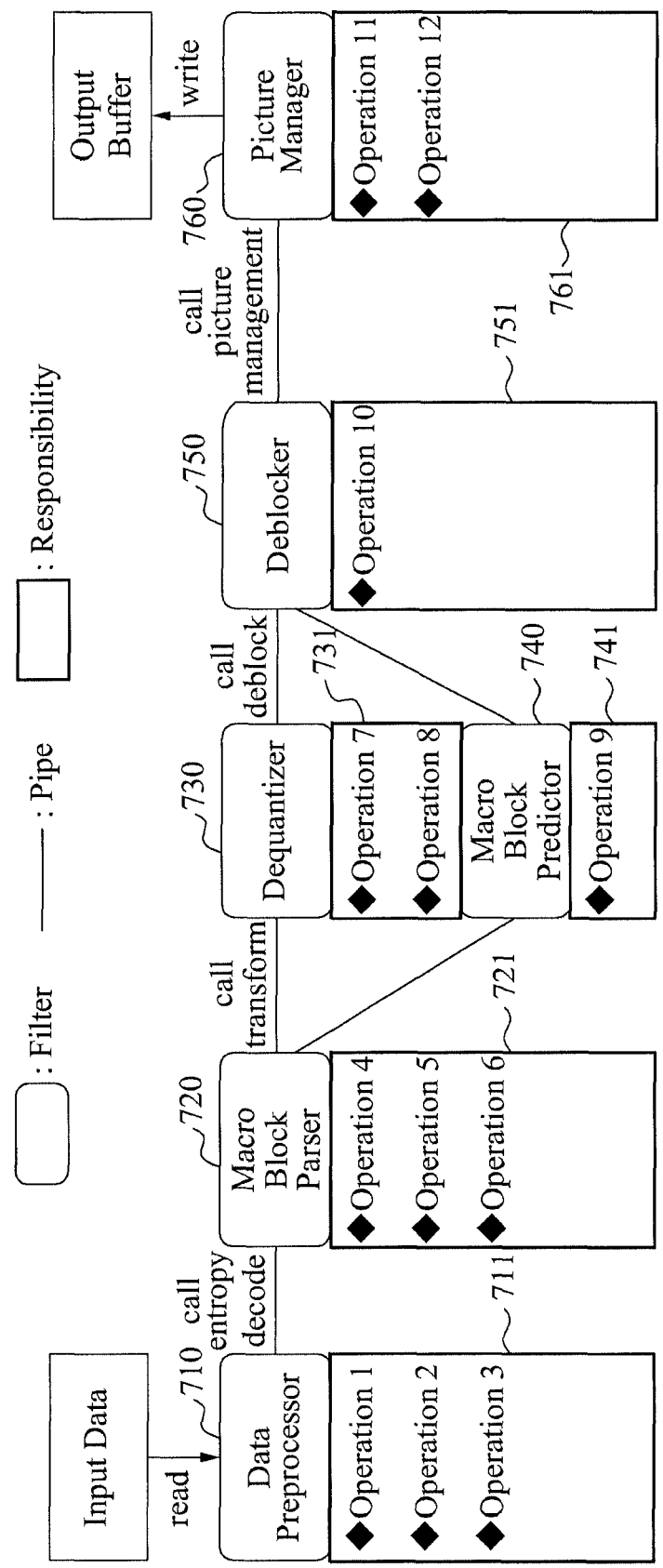
FIG. 7 illustrates a diagram of an example of a static architecture as a reference architecture according to example embodiments.

FIG. 7 illustrates a diagram of an example of a static architecture as a reference architecture according to example embodiments.

The architecture transformation apparatus may generate a reference architecture by arranging concurrent components in a system operation order. The static architecture may represent a connection relationship between concurrent components, and operations that each of the concurrent components need to perform.

In example embodiments, a video decoder system may sequentially process frames piled up in an input buffer, decode the processed frames, and perform serial processes used in an output buffer. Accordingly, the video decoder system may have a process model, such as a "Pipe & Filter" pattern. However, differently from a basic "Pipe & Filter" pattern, a dequantizer and a macro block predictor may be operated prior to driving the deblocker, regardless of their respectively orders. Accordingly, the dequantizer and the macro block predictor may be concurrently operated.

Referring to FIG. 7, in the static architecture, components, connectors between the components, and functions performed by the components are clearly described. Input data may be processed by a data preprocessor 710, a macro block parser 720, a dequantizer 730, a macro block predictor 740, a deblocker 750, and a picture manager 760, and the processed data may be stored in an output buffer.

An operation 711 performed by the data preprocessor 710 may include operations 1, 2 and 3. The operation 1 may include an operation of reading a header type value of NAL data and identifying a type of corresponding data among an SPS, a PPS, an IDR, and a slice. The operation 2 may include an operation of storing corresponding data in each data structure and reading next NAL data, when the data is of SPS, PPS, and IDR. The operation 3 may include an operation of sending data to be restored to a macro block parser when the data is of the slice.

An operation 721 performed by the macro block parser 720 may include operations 4, 5, and 6. The operation 4 may include an operation of verifying macro blocks of an image to be restored. The operation 5 may include an operation of storing position information of a reference image as a motion vector, and dividing an image into corresponding pixels, when a prediction image is to be restored, and when the reference image exists. Further, the operation 6 may include an operation of dividing an image into corresponding pixels, when an intra image is independently restorable.

An operation 731 performed by the dequantizer 730 may include operations 7 and 8. The operation 7 may include an operation of calculating an error value between an original image and a reference image. The operation 8 may include an operation of converting an expression range of corresponding data into an accurate value so that an error may be reduced and compression may be easily performed.

An operation 741 performed by the macro block predictor 740 may include an operation 9. The operation 9 may include an operation of applying an error between an original image and a reference image, predicting data to be restored, and of restoring the predicted data.

An operation 751, performed by the deblocker 750, may include an operation 10. The operation 10 may include correcting an error occurring in a corresponding image and a block distortion phenomenon, to provide a better quality to a restored image.

An operation 761 performed by the picture manager 760 may include operations 11 and 12. The operation 11 may include synchronizing a deblocked image in a sequence of an original image, and storing the synchronized image in a buffer. The operation 12 may include displaying, on a screen, 16 images in a storage sequence when all of the 16 images are stored in an image buffer.

Figure 8:
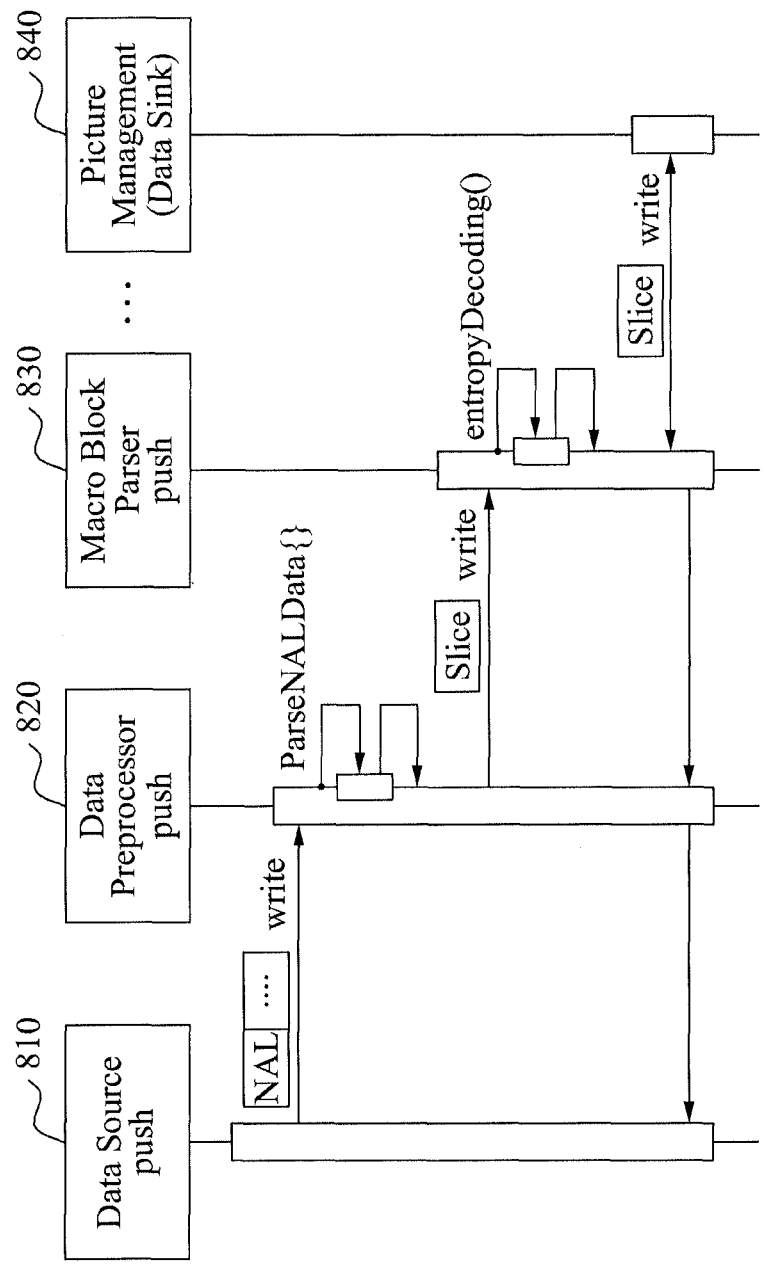
FIG. 8 illustrates a diagram of an example of a dynamic architecture as a reference architecture according to example embodiments.

FIG. 8 illustrates a diagram of an example of a dynamic architecture as a reference architecture according to example embodiments.

The dynamic architecture may represent how components identified in the static architecture of the system cooperate with each other in a dynamic view. There is no limitation to an expression process, however, a cooperation activity between components need to be accurately expressed.

Specifically, FIG. 8 illustrates a mutual cooperation between filters corresponding to identified processes of FIG. 7. In FIG. 8, data may be transmitted between filters using a push process among other operating processes of the "Pipe & Filter" pattern.

Referring to FIG. 8, a data source 810 may transmit NAL data to a data preprocessor 820 using the push process. When a header type corresponds to a slice, the data preprocessor 820 may transmit data to be restored to a macro block parser 830, using the push process. The macro block parser 830 may use entropy decoding to decode the data to be restored, using the push process, and may transmit the entropy decoded data to a filter of a next operation. Finally, a picture management 840 may synchronize a deblocked image in a sequence of an original image.

Figure 9:
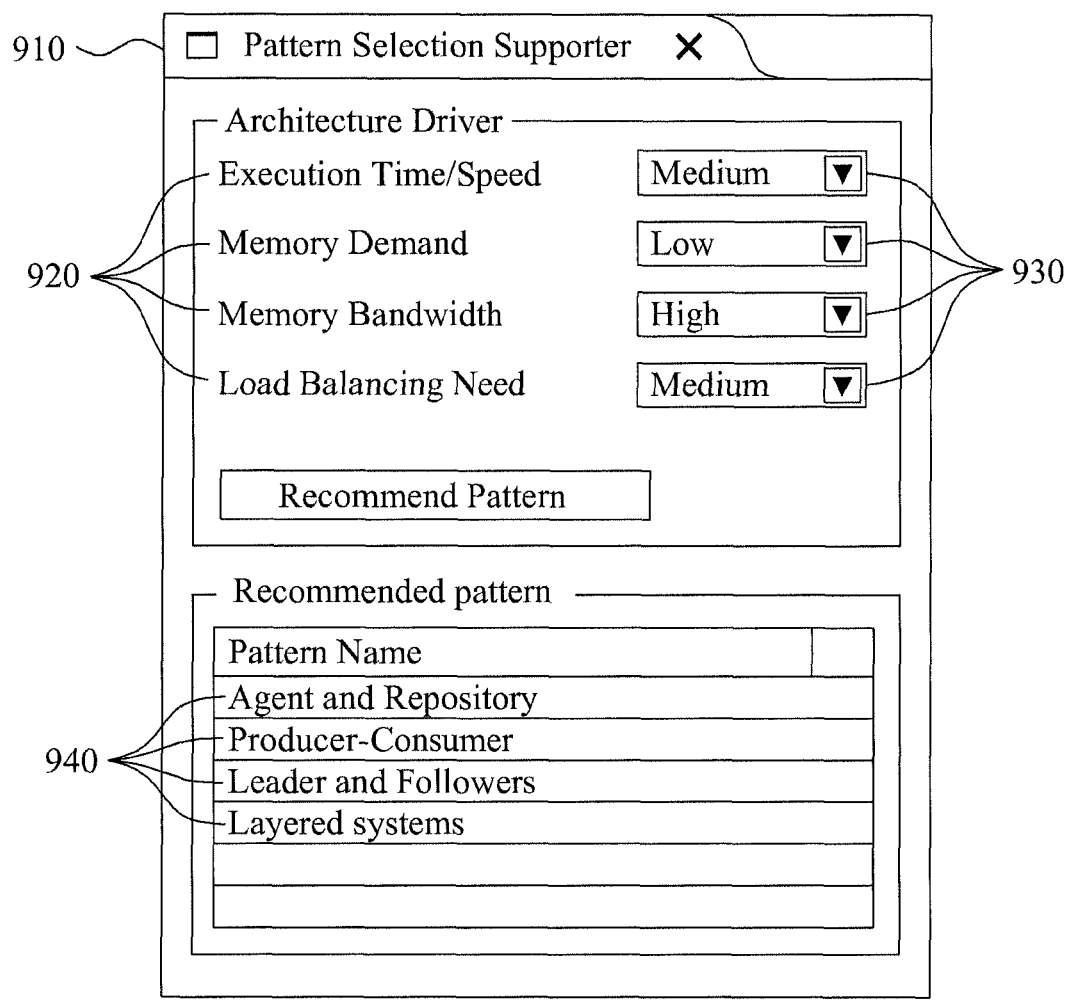
FIG. 9 illustrates a diagram of a pattern selection supporter according to example embodiments.

FIG. 9 illustrates a diagram of a pattern selection supporter 910 according to example embodiments.

The architectural decision supporter may include a pattern selection supporter 910 in the form of a user interface for outputting a list of architectural patterns. The pattern selection supporter 910 may output a list 940 of architectural patterns, based on a result of mapping the architectural patterns using architectural drivers 920 and priorities 930 of the architectural drivers 920. In this instance, the architectural drivers 920 may be stored in a database. When the priorities 930 are inputted, the pattern selection supporter 910 may output the list 940.

When transforming a single-core based architecture to a multi-core based architecture, the quality attribute may be matched to performance, and an architectural driver corresponding to the performance may include an execution time/speed, a memory demand, a memory bandwidth, and load balancing needs. When a priority of each architectural driver is set to be one of high, medium, and low, a list of applicable architectural patterns may be outputted.

In addition, the database may store a pattern specification corresponding to an architectural pattern. The pattern specification may include a pattern operating process, and a checklist for applying patterns.

Figure 10:
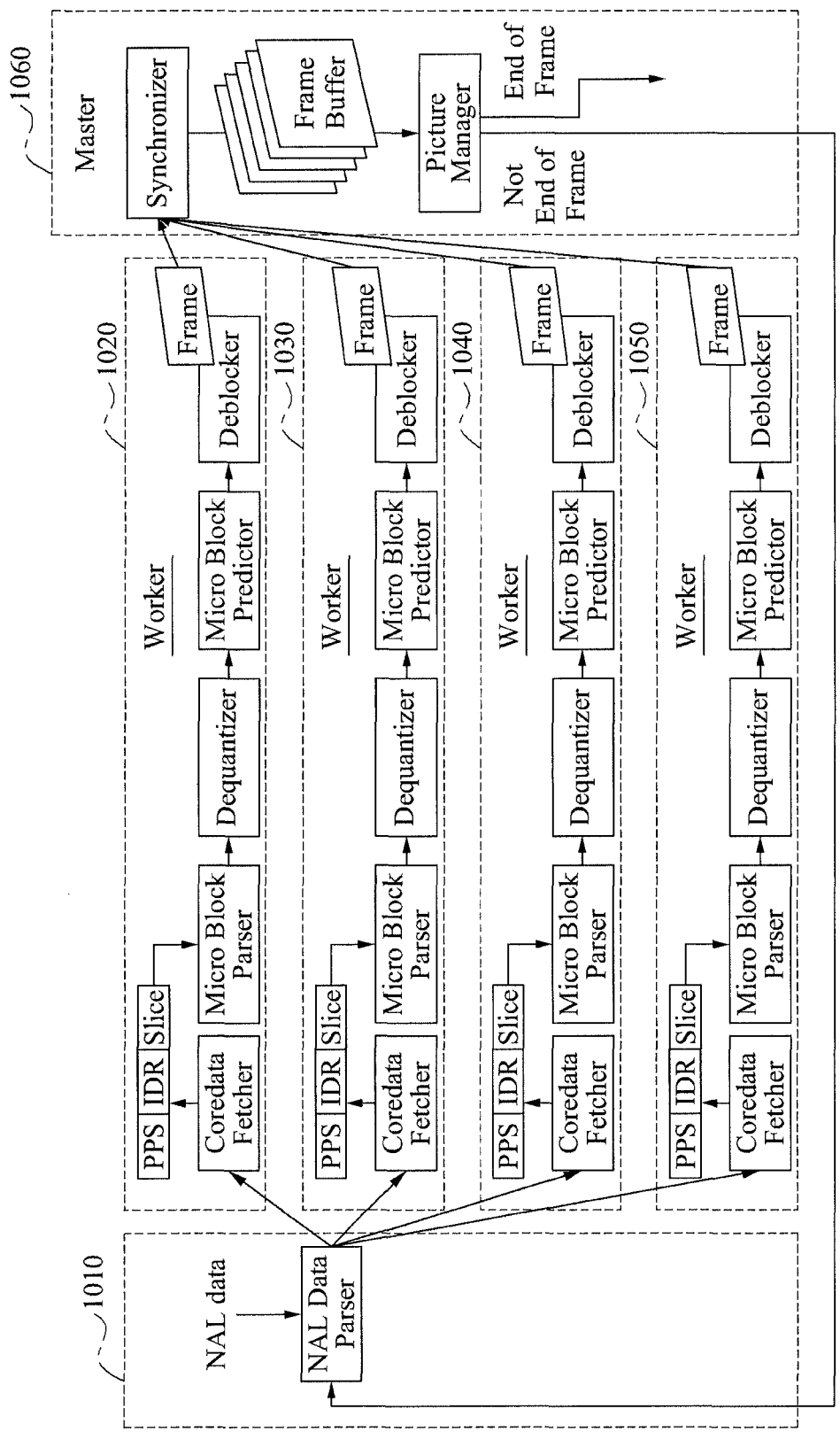
FIG. 10 illustrates a diagram of an example of an alternative of a system architecture according to example embodiments.

FIG. 10 illustrates a diagram of an example of an alternative of a system architecture according to example embodiments.

The architecture transformation apparatus may generate alternative architectures, based on constraints, a single-core based reference architecture, and an acquired architectural pattern.

For example, in a four-core based video decoding system, a first architecture alternative is called a "Dynamic Master & Worker". In the "Dynamic Master & Worker", a process thread may be divided into two types, for example a master thread 1060, and a worker thread 1020, 1030, 1040, or 1050.

Referring to FIG. 10, a master thread 1060 may perform a process of reading NAL data 1010 stored in an input buffer through a NAL data parser, and of dividing the read NAL data into pieces of data to be processed in each core.

Additionally, worker threads 1020, 1030, 1040, and 1050 may perform a decoding process, in the same manner as a reference architecture generated based on a single-core system. Four cores of the worker threads 1020, 1030, 1040, and 1050 may simultaneously decode four frames, in a different manner from the single-core system. Furthermore, each of the four cores may decode different frames of assigned video data through the same process.

A master thread 1060 may perform a process of determining a temporal relationship between four decoded frames and storing the four frames in a frame buffer, through a synchronizer. Additionally, the master thread 1060 may perform a process of outputting 16 frames stored in the frame buffer through a picture manager.

Figure 11:
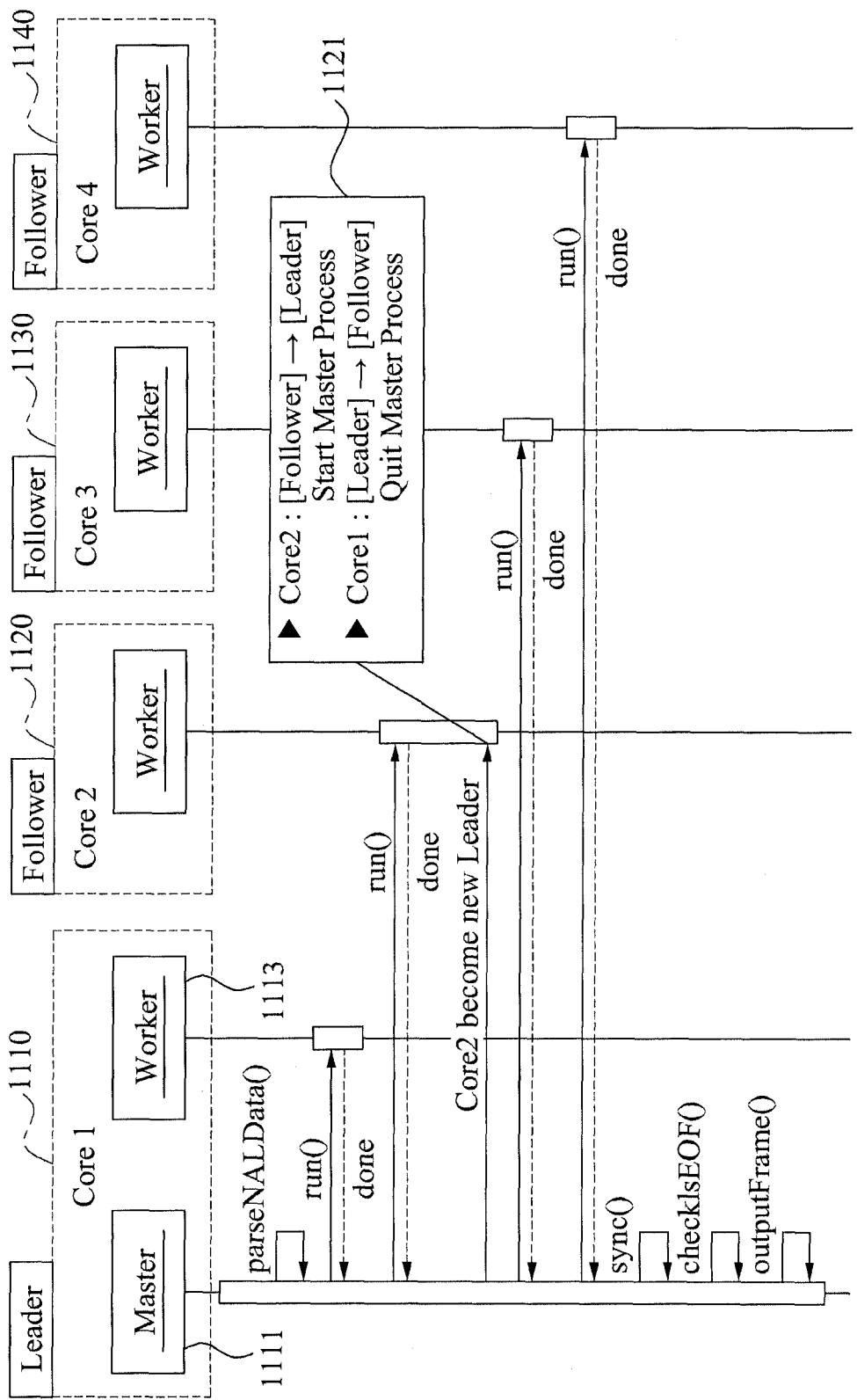
FIG. 11 illustrates the alternative of FIG. 10 using a mutual cooperation diagram.

FIG. 11 illustrates the alternative of FIG. 10 using a mutual cooperation diagram.

Referring to FIG. 11, one of worker threads may be operated in the same core as a master thread. When a "Leader & Follower" pattern is acquired as an architectural pattern, a core where both the worker thread and the master thread are operated may be referred to as a leader core 1110.

The master thread loaded in the leader core may include a synchronizer for synchronizing between worker threads in each core. Accordingly, in principle, an idle time may occur until processing of each core is completed.

A first alternative architecture may change the leader core to enable a core terminated first among cores of followers that simultaneously process a frame to perform a function of a next leader.

In FIG. 11, a core 1 1110 may be used as a leader core including a master thread 1111 and a worker thread 1113. Additionally, a core 2 1120, a core 3 1130, and a core 4 1140 may be used as follower cores, including worker threads. The core 2 1120 may function as a follower core when first four frames are processed. However, when an operation of the worker thread 1113 is terminated, a role of a leader may be assigned to the core 2 1120 by the leader core, namely the core 1 1110. The core 2 1120 as the leader core may start driving process of the NAL data parser among master threads, and may minimize the idle time taken until processing of other follower cores is completed.

Figure 12A:
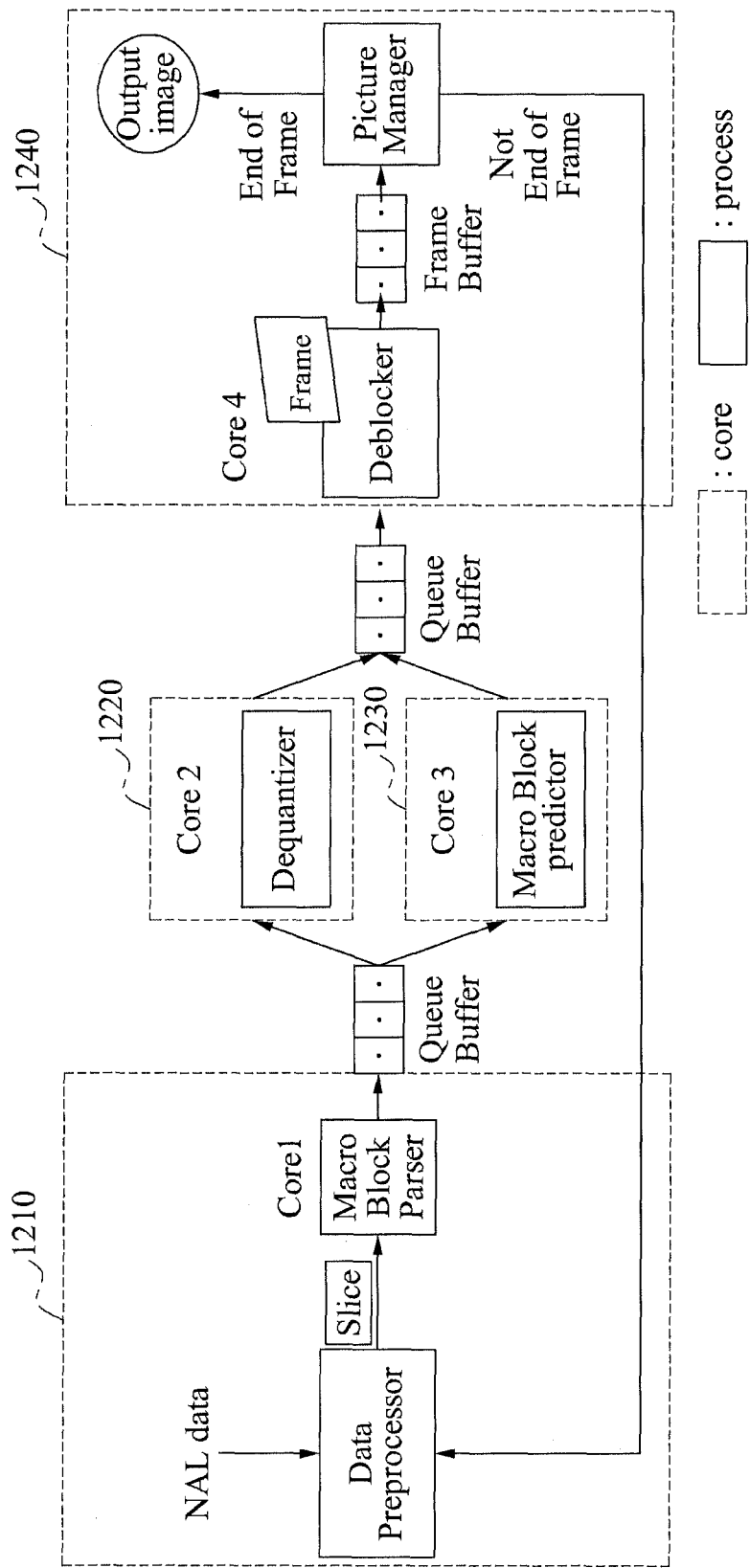
FIGS. 12A and 12B illustrate other examples of the alternative of the system architecture according to example embodiments.
Figure 12B:
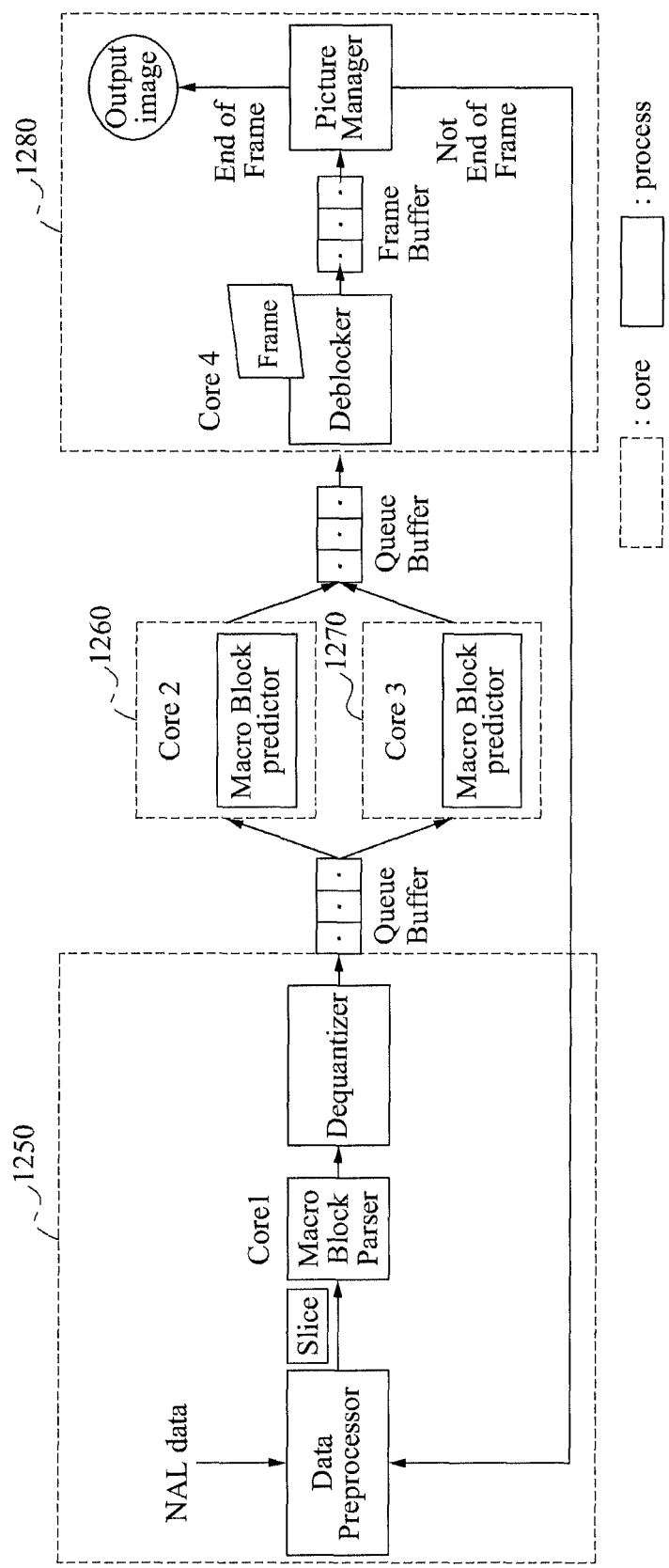

FIGS. 12A and 12B illustrate other examples of the alternative of the system architecture according to example embodiments.

A second alternative architecture may have a pipeline structure in the same manner as a single-core based reference architecture. However, when a single-core based architecture is transformed to a multi-core based architecture, independent processes operating in a single core may be assigned to four cores based on a computing load. Additionally, queue buffers may be positioned between the cores, and may be caused to function as pipes.

Functional parallelism may be realized by loading different processes in each of the cores. Additionally, in a pipeline structure, frame data to be decoded may be sequentially processed, and thus, there is no need to perform a separate synchronization.

Referring to FIG. 12A, a data preprocessor process and a macro block parser process may be assigned to a core 1 1210. Additionally, a dequantizer process may be assigned to a core 2 1220, and a macro block predictor process may be assigned to a core 3 1230. Moreover, a deblocker process and a picture manager process may be assigned to a core 4 1240.

As illustrated in FIG. 12B, the second alternative architecture may be changed based on a difference in computing load between processes performed by each of the cores 1 to 4.

In the pipeline structure, when the performance of a single process is significantly reduced, a small performance improvement effect caused by transformation to a multi-core system may be exhibited. As a result of analyzing each process of a single-core system, the longest time may be consumed by a macro block predictor process. Accordingly, it is possible to distribute a computing load concentrating on the macro block predictor process, by performing the macro block predictor process in parallel in two cores.

In FIG. 12B, a data preprocessor process, a macro block parser process, and a dequantizer process may be assigned to a core 1 1250. Additionally, two macro block predictor processes may be respectively assigned to a core 2 1260 and a core 3 1270. Furthermore, a deblocker process and a picture manager process may be assigned to a core 4 1280.

Figure 13:
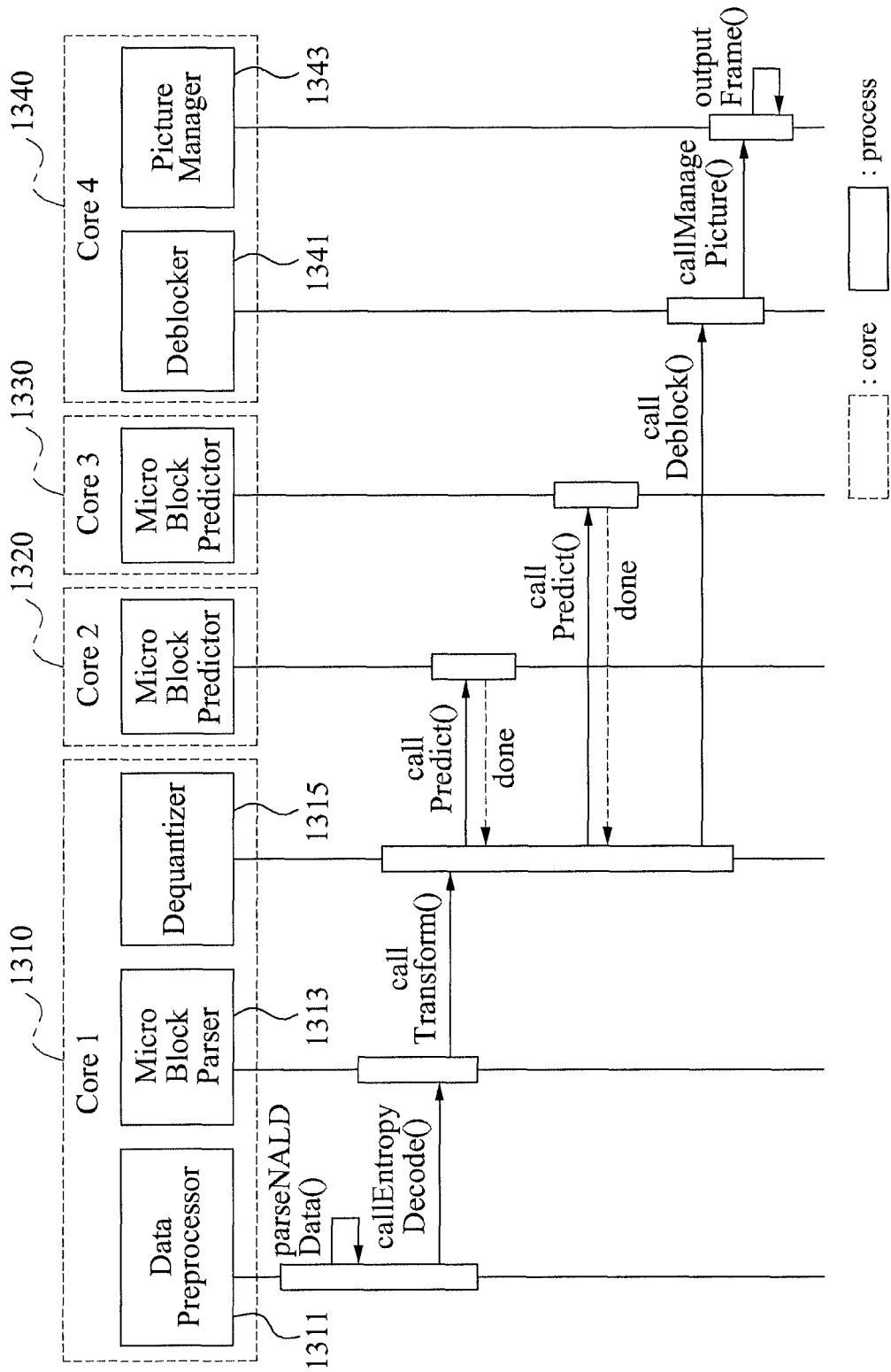
FIG. 13 illustrates the alternative of FIG. 12B using a mutual cooperation diagram.

FIG. 13 illustrates the alternative of FIG. 12B using a mutual cooperation diagram.

Specifically, FIG. 13 illustrates a sequence diagram of a mutual corporation relationship between cores and processes in the cores, in the alternative to FIG. 12B.

In FIG. 13, a data preprocessor process 1311, a macro block parser process 1313, and a dequantizer process 1315 may be assigned to a core 1 1310. Additionally, two macro block predictor process may be respectively assigned to a core 2 1320 and a core 3 1330. Furthermore, a deblocker process 1341 and a picture manager process 1343 may be assigned to a core 4 1340.

After the macro block predictor processes are simultaneously performed in both the core 2 1320 and the core 3 1330, the deblocker process 1341 may be performed.

Figure 14:
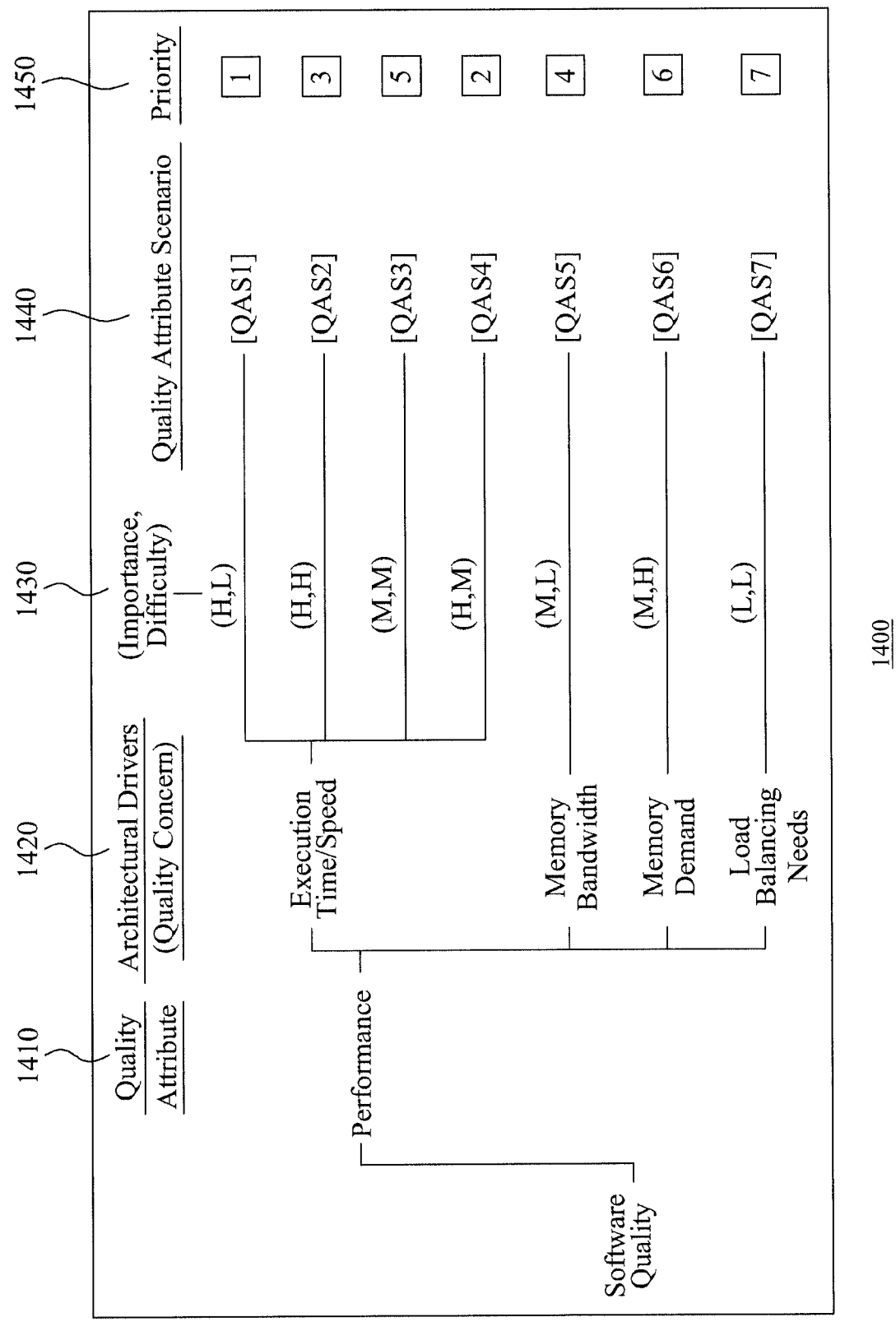
FIG. 14 illustrates a diagram of a quality attribute tree of a video decoder system according to example embodiments.

FIG. 14 illustrates a diagram of a quality attribute tree 1400 of a video decoder system according to example embodiments.

When an overall quality of software is assumed as a root node, the quality attribute tree 1400 may be generated by forming layers in an order of a quality attribute 1410, a quality concern 1420, and a quality attribute scenario 1440. Additionally, an importance/difficulty 1430 for determining a priority of a quality attribute scenario, and a priority 1450 of a quality attribute scenario may be additionally reflected.

In this instance, a guideline for the quality concern may not be provided in an ATAM. To determine architectural patterns, the architecture transformation apparatus may use four architectural drivers as a criterion to classify quality attribute scenarios, by reflecting the four architectural drivers on the quality concern. Here, the four architectural drivers used as main input values may include, for example, an execution time/speed, a memory demand, a memory bandwidth, and load balancing needs.

The importance/difficulty 1430 may be set in advance based on the quality attribute scenario. Here, the importance may refer to an influence of a corresponding scenario on a system success.

In a video decoding system, a first quality attribute scenario QAS1 may indicate that when a single-core system is transformed to a four-core system, a frequency (Hz) of 35% needs to be outputted by a power consumed to perform a normal operation, compared to the single-core system.

A second quality attribute scenario QAS2 may indicate that a video data decoding performance needs to satisfy 2.5 data frames/second, which is about three times compared to an existing single-core system, under the normal operation.

A third quality attribute scenario QAS3 may indicate that 1280×720 pixels are supportable by a video decoder in the same manner as the existing single-core system, under the normal operation.

A fourth quality attribute scenario QAS4 may indicate that an increase in overhead caused by communication between cores needs to be within 10%, under the normal operation.

A fifth quality attribute scenario QAS5 may indicate that a bit rate for measuring a quality of a screen displayed by a video decoder needs to support 20 Mbps in the same manner as the existing single-core system, under the normal operation.

A sixth quality attribute scenario QAS6 may indicate that a memory usage amount for the normal operation needs to be increased within 70%.

A seventh quality attribute scenario QAS7 may indicate that the time that each core remains in an idle state during the total system operating time needs to be within 15% during the normal operation.

As illustrated in FIG. 14, based on the priority 1450, a scenario of lowering a value of Hz of the consumed power, that is, of increasing an execution speed, may have the highest priority among performance-related scenarios.

Additionally, when each scenario is reflected to a system, an influence of architectural drivers may be determined based on a ranking of the quality attribute scenarios, in addition to the priority. In a video decoder system, the execution time/speed, the memory demand, the memory bandwidth, and the load balancing needs may be sequentially affected by the architectural drivers.

The trade-off analysis may be performed based on a development priority of a scenario assigned to the quality attribute tree. To perform the trade-off analysis, an architectural approach analysis report generated with respect to each architecture alternative may be used, as shown in Table 6 below. The architectural approach analysis report of Table 6 shows pros and cons of proposed alternative architectures. The architectural approach analysis report may be stored in a database, and may be set in advance by a user. The pros and cons of the alternative architectures may be connected with quality attribute scenarios. The pros may mean that a corresponding architecture alternative acts as a positive factor in implementing a connected scenario in a system. Conversely, the cons may mean that that a corresponding architecture alternative acts as a negative factor in implementing a connected scenario in a system. Generally, an architecture alternative may not act as a positive factor in all scenarios. To determine an optimal architecture alternative, pros and cons of individually identified alternative architectures may be analyzed and as a result, a single architecture alternative acting as a positive factor may be selected from among the alternative architectures.

TABLE 6

| | |
|---|---|
| Architectural Approach 1 | Dynamic Master & Worker |
| Pros. | Increase in data processing speed exceeding a predetermined level is guaranteed, compared to a single core, by respectively assigning decoding threads to four independent cores. (++QAS1, ++QAS3, +QAS4) |
| Cons. | 1. Since most source codes need to be loaded in all cores due to operation of dynamic Leader & Worker, memory size is increased. (−−QAS6)<br>2. Separate synchronization is required before frames processed in each core are written in output buffer. (−QAS1)<br>3. Data transmission rate between master and worker is greater than at least 4 frames. (−−QAS6) |
| Architectural Approach 2 | Pipeline |
| Pros. | Data transmission rate of data flowing along pipeline corresponds to 1 frame in predetermined view. Effect of reducing data transmission rate between cores, effect of reducing Queue Buffer Size.<br>And effect of reducing size of source code loaded in single core since filters operating in single core are partially scattered in each core. (++QAS6) |
| Cons. | 1. Execution time of entire system is dependent on Computation Time of predetermined core, and when overload occurs in predetermined core, it is impossible to expect improvement of data processing speed compared to single core. (−−QAS1)<br>2. Number of times computation between cores is greater than Approach 1. (−QAS4) |
| Conclusion | Relationship of pros and cons of Approach 1 and Approach2, quality attribute scenarios, and development priority assigned to each quality attribute is shown as below. |

| Quality Attribute Scenario No. | Architecture Approach1 | Architecture Approach2 | Priority |
|---|---|---|---|
| QAS1 | +++ | −− | 1 |
| QAS6 | ++ | / | 5 |
| QAS4 | + | − | 2 |
| QAS6 | −−−− | ++ | 6 |
| QAS7 | / | ++ | 7 |

1. Approach 1 has a structure of minimizing Idle Time of each Core, and corresponds to an architecture supporting QAS1, QAS3, and

TABLE 6-continued

QAS4. However, Approach 1 tends to significantly reduce quality of QAS6 having priority of 6.
2. Approach 2 supports QAS6 relatively well, having a priority of 6, however, reduces qualities of QAS 1 and QAS4 having higher priorities.
Thus, Approach 1, showing good performance in QAS1 having priority of 1, is determined as an optimal alternative between Architectural Approaches 1 and 2.

Figure 15:
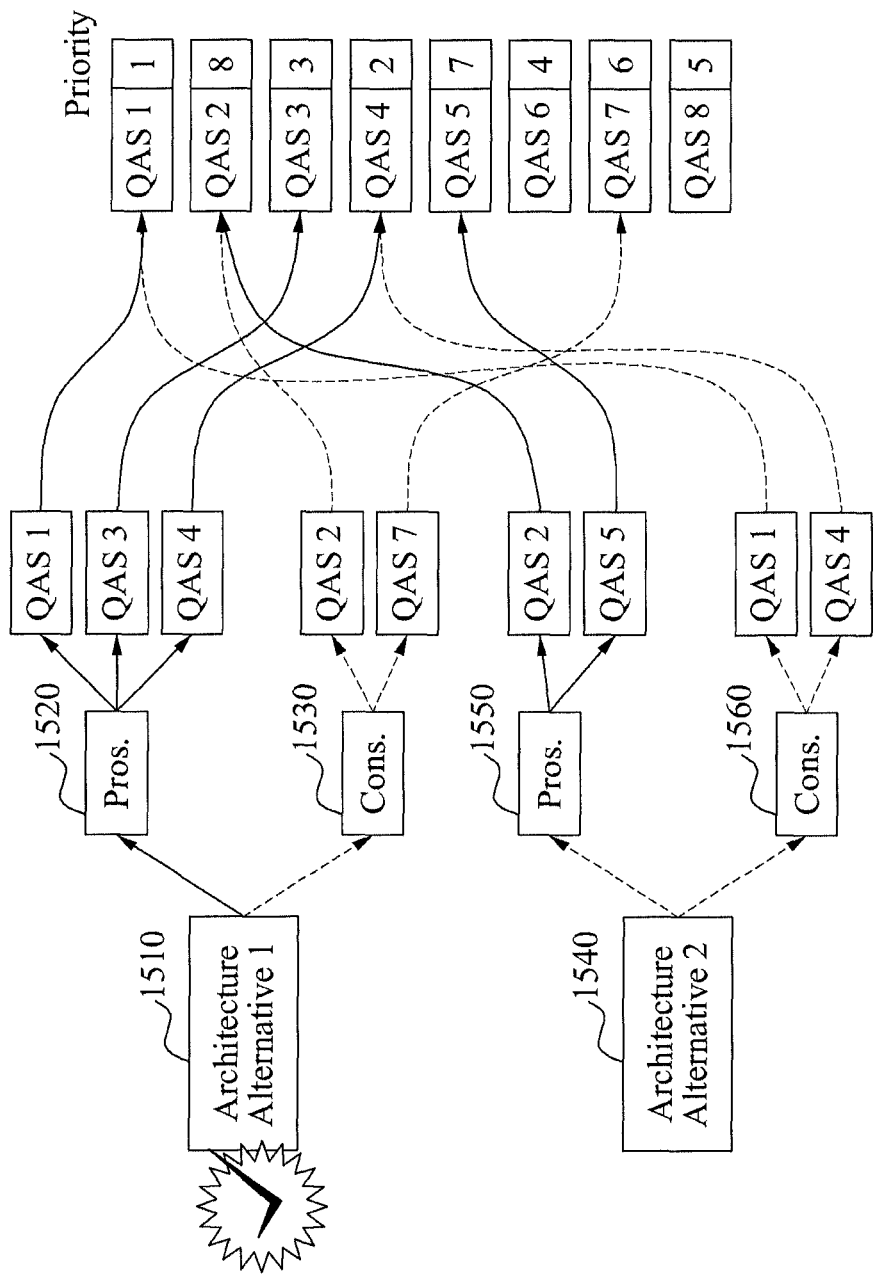
FIG. 15 illustrates a diagram of a concept of a method of determining an optimal alternative architecture according to example embodiments.

FIG. 15 illustrates a concept of a method of determining an optimal architecture alternative according to example embodiments.

In FIG. 15, it is assumed that an alternative architecture 1 1510 and an alternative architecture 2 1540 exists. Each of the alternative architecture 1 1510 and alternative architecture 2 1540 may include pros and cons. The pros may act as a positive factor in several quality attribute scenarios (QAS), and may be represented by solid lines in FIG. 15. The cons may act as a negative factor in several quality attribute scenarios, and may be represented by dotted lines in FIG. 15. Priorities assigned to quality attribute scenarios may be used as a criterion for determining an optimal alternative architecture.

In the alternative architecture 1 1510, QAS1, QAS 3, and QAS 4 that each have higher priorities of 1, 3, and 2 may have pros 1520 acting as positive factors. Conversely, QAS 2 and QAS 7 that each have lower priorities of 8 and 6 may have cons 1530 acting as negative factors.

In the alternative architecture 2 1540, QAS 2 and QAS 5 that each have lower priorities of 8 and 7 may have pros 1550 acting as positive factors. Conversely, QAS 1 and QAS 4 that each have lower priorities of 1 and 2 may have cons 1560 acting as negative factors.

Thus, the alternative architecture 1 1510 having the pros 1520 of the quality attribute scenarios QAS 1, QAS 3, and QAS 4 having higher priorities may be determined as a final architecture alternative between the two alternative architectures.

Figure 16:
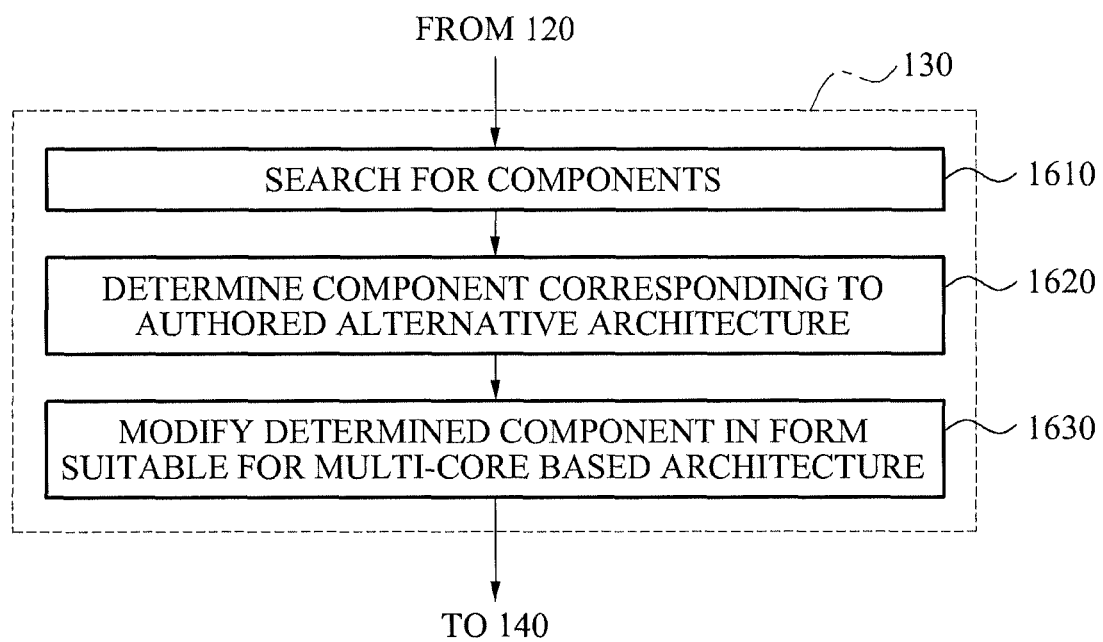
FIG. 16 illustrates a detailed flowchart of an operation of instantiating the authored alternative architecture in the method of FIG. 1.

FIG. 16 illustrates a detailed flowchart of operation 130 of FIG. 1. Operation 130 may be performed through searching, determining, and modifying of components, to actually implement the authored alternative architecture.

In operation 1610, the architecture transformation apparatus may search for components using the architectural decision supporter. The architecture transformation apparatus may search for components on the architecture from a software asset storage using the architectural decision supporter. The software asset storage may store a software asset. The software asset may store information on a function of a component, a name of the component, and components mapped with the function and the name. The component may include a concurrent component and a physical component. The physical component may include a source code component. The software asset storage may be set in advance, and may be stored in a database.

The architecture transformation apparatus may search for, through the architectural decision supporter, a component already developed among components on an architecture, by using a name of a component or a function of a component as a keyword.

In operation 1620, the architecture transformation apparatus may determine a component corresponding to the authored alternative architecture, among the found components.

The architecture transformation apparatus may determine a physical component among the found components, based on reference data supported by the architectural decision supporter. In this case, the physical component may perform a role of a component identified on the authored alternative architecture. The reference data may refer to the software asset stored in the software asset storage.

In operation 1630, the architecture transformation apparatus may modify the determined component in a form suitable for a multi-core based architecture. The architecture transformation apparatus may modify the determined source code component in the form suitable for the multi-core based architecture. The architecture transformation apparatus may reduce costs of an overall development process by reusing source code components that are already developed and stored in the software asset storage.

Figure 17:
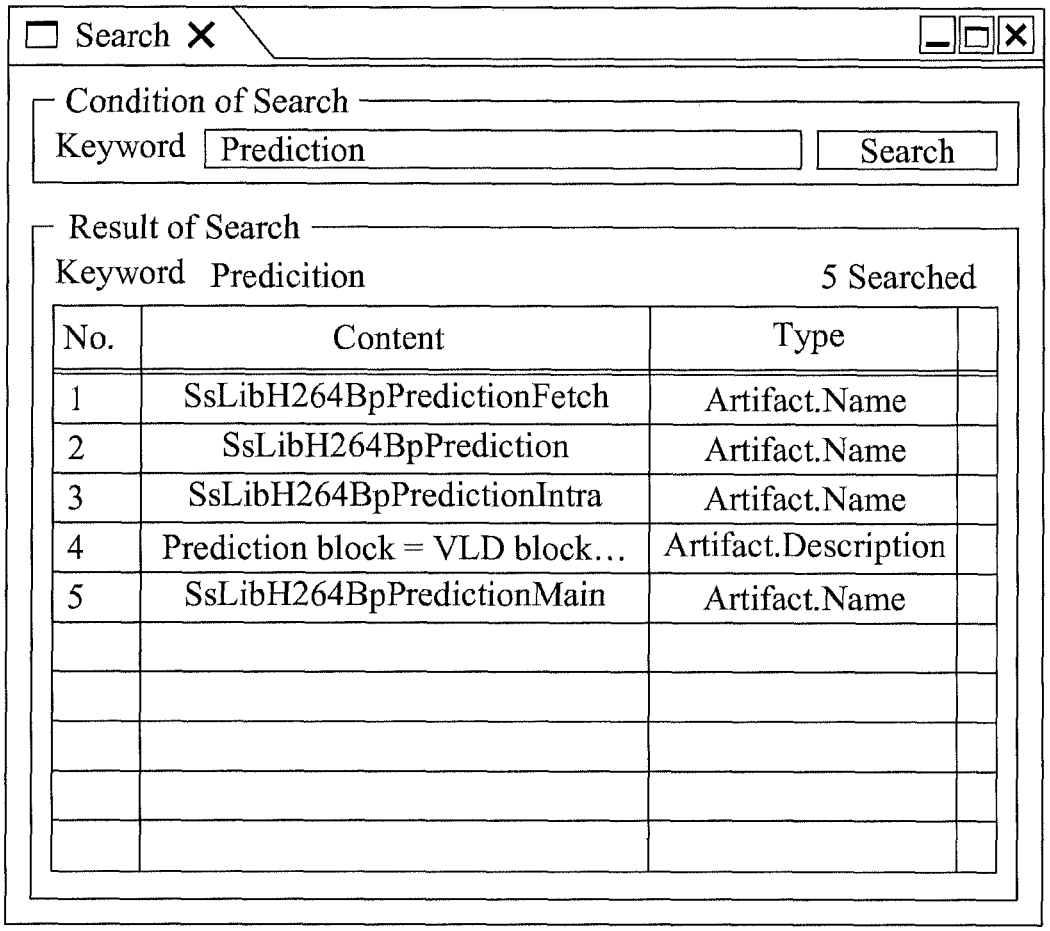
Figure 19:
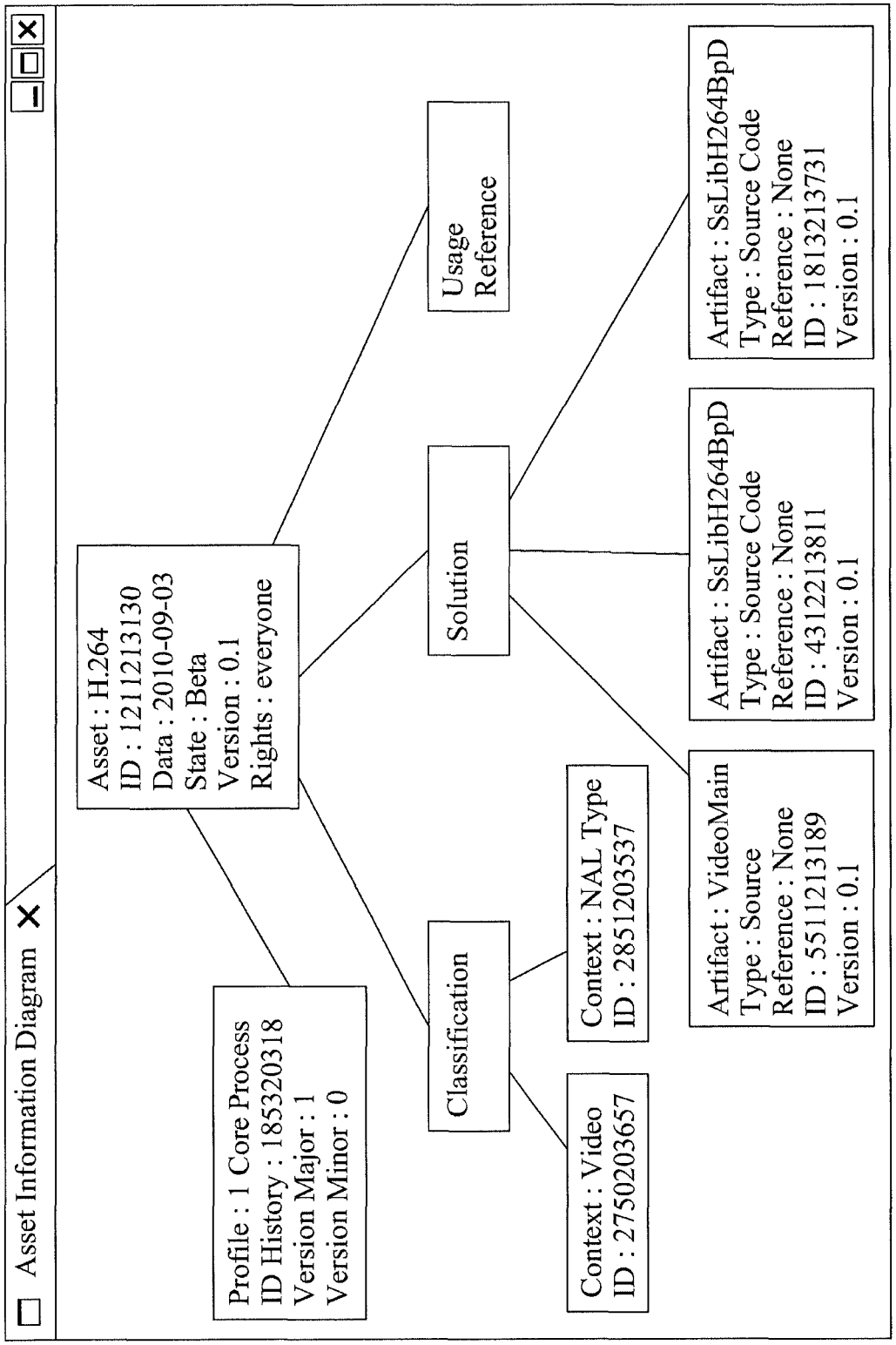

FIGS. 17 to 19 illustrate diagrams of a software asset according to example embodiments.

The architecture transformation apparatus may access a software asset storage, and may search for an already developed component among components in an architecture through the architectural decision supporter.

In this instance, a keyword searching process of using, as a keyword, a desired function or a name of a component may be performed by the architecture transformation apparatus.

Specifically, FIG. 17 illustrates an example of a software asset search screen displayed when the architectural decision supporter is used to search for a prediction-related component.

FIG. 18 illustrates an example of detailed information regarding one of the found components. FIG. 19 illustrates an example of an entire structure of a software asset where one of the found components belongs. The detailed information and the entire structure may be used as reference data for determining a component performing a role of an identified component on the authored alternative architecture.

Figure 20:
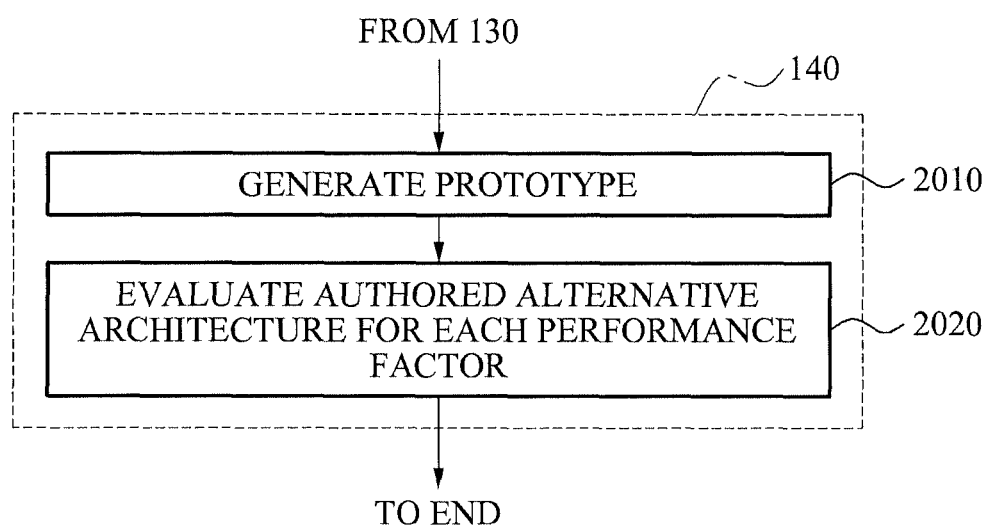
FIG. 20 illustrates a detailed flowchart of an operation of performing quantitative evaluation with respect to the authored alternative architecture in the method of FIG. 1.

FIG. 20 illustrates a detailed flowchart of operation 140 of FIG. 1.

In operation 2010, the architecture transformation apparatus may generate a prototype for evaluating the authored alternative architecture. The architecture transformation apparatus may generate a system prototype having a quantitatively measurable performance, based on the authored alternative architecture and a code developed using a single core.

To quantitatively evaluate the authored alternative architecture, a prototype where a portion of functions of an actual system is reflected may be used. The prototype may be generated to evaluate whether an architecture supporting an increase in performance of a system in proportion to a number of multi-cores is authored. When a prototype is generated, additional reflecting of a function that is not provided by a single core may be avoided.

A video decoder system as an example system may have only a single function of decoding compressed video data. Accordingly, a prototype for performing a video decoding function may be used. In an example of a software product with various functions and services, a number of main functions may be desirably limited to one or two, by minimizing a range of a prototype for evaluating an architecture. A quantitative evaluation using a prototype may be performed to measure a performance improvement level after transformation to a multi-core based architecture, with respect to the state before the transformation. Accordingly, it is significant that a function where a great overhead is predicted in view of performance is reflected.

In operation 2020, the architecture transformation apparatus may evaluate the authored alternative architecture for each performance factor, based on the prototype.

The performance factor may include a response measure, evaluation results, and an acceptance range.

The architecture transformation apparatus may measure evaluation results, based on a response measure among quality attribute scenarios. The architecture transformation apparatus may quantitatively evaluate the authored software architecture based on the acceptance range.

Items selected as response measure items from the quality attribute scenario may be used as a metric, namely, a performance measure item during the quantitative evaluation of the architecture. Different items may be used as response measure items based on a system, however, software products belonging to the same domain may have similar response measure items. A target performance of a multi-core system may be defined as a ratio to a performance of an existing single-core system in most cases. A performance analysis result may be obtained by comparing the performance of the multi-core system with the performance of the existing single-core system. In a quality attribute scenario, an expected performance level of a system may be denoted as numerical values based on a unit described in the response measure. The expected performance level may be represented as a value of an acceptance range. Performance values measured by executing a prototype may correspond to evaluation results. A comparison analysis result, namely, an enhancement may show a performance improved compared to the single-core system using a percentage. Table 7 shows the performance analysis result of the example system.

TABLE 7

| Metric | Single Core | Acceptance Range | Evaluation Results | Enhancement |
| --- | --- | --- | --- | --- |
| System operating frequency (Hz) | 1148 MHz | 35% with respect to single-core system | 334 MHz | 29% with respect to single core |
| Used memory capacity | 29827 KB | Increment by 70% with respect to single-core system | 47548 KB | Increment by 59% with respect to single core |
| Percentage of idle time of cores | 0% | 15% with respect to total running time | 13% | Occurrence of overhead of 13% with respect to overall performance in multi-core management |
| Processing data frames/second | Second 0.87 fps | 2.5 data frames/second | 2.99 fps | Enhancement of processing speed 3.4 times, compared to single core |
| Number of output pixels | 1280 × 720 | 1280 × 720 | 1280 × 720 | Supporting of the same pixel size as single core |
| Output bit rate | 20 Mbps | 20 Mbps | 20 Mbps | Maintaining of the same quality as single core |

Referring to Table 7, in a video decoder where an authored architecture is implemented based on four cores, a processing speed was enhanced about 3.4 times compared to the single core, while maintaining the same display screen size and the same image quality as the single-core system.

When an idle time of each core corresponds to "0", the processing speed is expected to be improved by four times. However, comparing with the single-core system, an idle time of about 13% occurred in each core due to a communication and synchronization among cores, and accordingly, the processing speed is analyzed to be reduced by about 0.6 times with respect to an ideal value. The system operating frequency (Hz) with the highest priority among quality attribute scenarios has a value lower than 35% with respect to the single-core system that is a target value, since video decoding was performed at a level of 29% with respect to the single core. In other words, a better result than expected performance level is shown.

Accordingly, it is proved that an architecture where the "Dynamic Leader & Followers" selected as an optimal alternative among the alternative architectures in the example system is applied is proper in view of quantitative evaluation.

Figure 21:
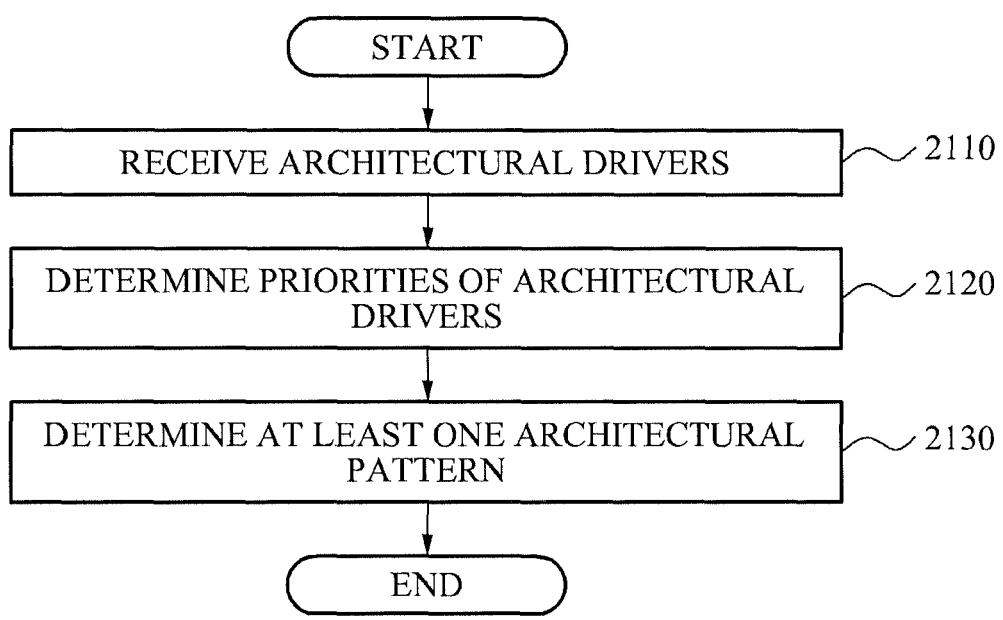
FIG. 21 illustrates a flowchart of a method of determining a multimedia architectural pattern to transform a single-core based architecture to a multi-core based architecture according to example embodiments.

FIG. 21 illustrates a flowchart of a method of determining a multimedia architectural pattern to transform a single-core based architecture to a multi-core based architecture according to example embodiments.

The method of FIG. 21 may provide a method of determining a minimum architectural pattern set suitable for a given system among patterns related to a concurrency ensuring problem. All concurrency-related patterns in literatures published to date may be collected, and a direct mapping rule with elements that may be defined as architectural drivers may be defined. Additionally, it is possible to reduce time and costs consumed for authoring an architecture, by acquiring an architectural pattern related to a system context based on the mapping rule, even when there is no separate software architecture-related knowledge.

In operation 2110, the architecture transformation apparatus may receive an input of architectural drivers. The architectural drivers may include an execution time/speed, a memory demand, a memory bandwidth, and load balancing needs.

In operation 2120, the architecture transformation apparatus may determine priorities of the architectural drivers based on a functional requirement and a non-functional requirement of a software architecture. When a focus is placed on a performance among quality attributes in the non-functional requirement, a priority of an execution time/speed and a priority of low balancing needs may be determined to be high, and a priority of a memory demand and a priority of a memory bandwidth may be determined to be low. Additionally, the priorities of the architectural drivers may be optionally set by a user.

In operation 2130, the architecture transformation apparatus may determine at least one architectural pattern from a mapping table, based on the priorities determined in operation 2120. The mapping table may be stored in a software asset storage and a database.

The mapping table may include concurrency-related architectural patterns, and the architectural drivers. The concurrency-related architectural patterns, and the priorities of the architectural drivers may be mapped to each other based on a checklist.

The architecture transformation apparatus may determine, as a recommended pattern, an architectural pattern matched to the determined priorities of the architectural drivers. Additionally, the architecture transformation apparatus may determine, as a partially adaptable pattern, an architectural pattern partially matched to the determined priorities of the architectural drivers.

TABLE 8

| Category | Architecture Pattern | N-Core Multimedia Applicability (Y/N) | Execution Time/Speed H | Execution Time/Speed N | Execution Time/Speed L | Memory Demand H | Memory Demand N | Memory Demand L | Memory Bandwidth H | Memory Bandwidth N | Memory Bandwidth L | Load Balancing Needs H | Load Balancing Needs N | Load Balancing Needs L |
|---|---|---|---|---|---|---|---|---|---|---|---|---|---|---|
| Performance | Leader/Followers | Y | • | | | | | • | | | • | • | | |
| | Map Reduce | Y | • | | | • | | | • | | | • | | |
| | Pipes/Filters | Y | | • | | | • | | • | | | | | • |
| | Produce/Consumer | Y | • | | | | • | | | • | | | | • |
| | Scheduler | Y | | • | | | • | | | • | | | • | |
| | Acceptor/Connector | N | | | • | | • | | | • | | | • | |
| | Active Object | N | • | | | | • | | | • | | | • | |
| | Asynchronous Completion Token | N | • | | | | • | | | • | | | • | |
| | Asynchronous Processing | N | • | | | | • | | | | • | | • | |
| | Double-Checked Loding Optimization | N | • | | | | • | | | • | | | • | |
| | Event-based Asynchronous | N | • | | | | • | | • | | | | • | |
| | Event-based implicit invocation | N | | • | | | • | | | • | | | • | |
| | Half-Sync/Half-Asyne | N | • | | | • | | | | • | | | | • |
| | Iterative Refinement | N | • | | | • | | | | • | | | | • |
| | Monitor Object | N | | | • | • | | | | • | | | | • |
| | Prosctor | N | | • | | | • | | | • | | | | • |
| | Reactor | N | | | • | | • | | | • | | | | • |
| | Read/Write Lock | N | • | | | | • | | | • | | | | • |
| | Scoped Locking | N | | | • | | • | | | • | | | | • |
| | Seratogized Locking | N | • | | | | • | | | • | | | | • |
| | Threed Pool | N | • | | | | | • | | • | | • | | |
| | Thread-Safe Interface | N | | • | | | | • | | • | | | | • |
| | Thread-Specific Storage | N | • | | | | • | • | | | | | • | |

Table 8 shows an example of a mapping table indicating an applicability of each architectural pattern in view of four architectural drivers. For example, in Table 8, a "Leader/Followers" pattern that was applied during authoring of an architecture of an example system may be applied to a system having characteristics that the execution time/speed and the load balancing needs have high priorities and that the memory demand and memory bandwidth have low priorities.

All architectural patterns may not be related to all of the four architectural drivers. Since an "Acceptor/Connector" pattern has no trade-off relation to the four architectural drivers, a value "Neutral (N)" may be applied. The "N" value may indicate that a predetermined pattern is irrelevant to determination of a value of a corresponding multi-core architectural driver.

Mapping rationales of the architectural patterns and the four architectural driver values of Table 8 may be described in Tables 9 and 10 below. Table 9 shows mapping rationales and a checklist regarding patterns applicable to a multi-core system among architectural patterns associated with a performance quality attribute. Table 10 shows mapping rationales and a checklist regarding general patterns associated with a performance quality attribute.

TABLE 9

| No. | Pattern Name | Architectural Driver Value & Rationales | Checklist |
|---|---|---|---|
| 1 | Leader/ Followers | Execution speed (H) - Decrease in locking overhead between threads, and decrease in latency without context switching<br>Memory demand (L) - Each processor may perform its own role, since event handlers having different functions are loaded in each processor. Accordingly, it is possible to implement different handlers in each processor.<br>Memory bandwidth (L) - No consideration to process a large amount of data streams.<br>Load balancing needs (H) - Thread pool defined in pattern structure may ensure exact and efficient adjustment of thread, and may distribute loads based on implemented strategy. | Needs to process requests generated from various resources ?<br>Performance overhead, such as context switching and the like, frequently occurs in order to process a requested event ?<br>Locality density between threads for processing a requested event is relatively higher ?<br>Amount of Network I/O is relatively smaller ? |
| 2 | Map Reduce | Execution speed (H) - Pattern mainly used when a large amount of data is efficiently processed in parallel<br>Memory demand (H) - Since a large amount of data is distributed to a map, and is then copied several times through Reduce, a required memory size is increased.<br>Memory bandwidth (H) - Pieces of data with a large size pass through input and output at once.<br>Load balancing needs (H) - Implementation based on load balancing is possible according to an implementation strategy of a master. | Domain requiring distribution processing and parallel processing for a large amount of data ?<br>Domain distributing data to be processed by a corresponding system, and requiring load balancing of the distributed data?<br>Job processed by an application exhibits a batch characteristic ?<br>Data to be processed is expressible by a single key and value ?<br>Application where addition and deletion of a process for processing a large amount of data are predicted to frequently occur ? (Salability)<br>Problems to be solved are associated with parallel processing, fault-tolerance, loan balancing, locality optimization, and the like ? |
| 3 | Pipes/ Filters | Execution Speed (N) - Independent filters are individually performed in parallel with respect to a flow of a large amount of data, and accordingly a running time is reduced. However, when a long processing time of a predetermined filter is required, or when a filter capable of calculating an output value only using all inputs exists, a processing time may not be increased.<br>Memory demand (N) - Variable depending on an amount of source code arranged in each filter, and a large number of memories are consumed when global data having a considerable size needs to be shared between filters.<br>Memory bandwidth (H) - Memory bandwidth is increased when a large amount of data flows in each filter at a time, in the same manner as a batch sequential structure.<br>Load balancing needs (L) - Pieces of data collectively flow on a flow that is already formed with pipeline. | Application associated with data stream processing ?<br>Needs to assign different processing jobs to physically different processors ?<br>Application not requiring information sharing between components that are not adjacent to each other ?<br>Different processing operations may be changed and recombined in a corresponding domain system ? |

TABLE 9-continued

| No. | Pattern Name | Architectural Driver Value & Rationales | Checklist |
|---|---|---|---|
| 4 | Produce/ Consumer | Execution speed (H) - Processing speed may be accelerated by separation of a task generator and a processor Memory demand (N) - Variable depending on a queue size, or a size of a source code executed as a producer and a consumer Memory bandwidth (N) - Regardless of pattern use Load balancing needs (L) - Load is determined based on a ratio of a producer and a consumer, and it is difficult to expect improvement of load balancing, by only using a pattern. | Form of creating data and using the created data ? Creating data is faster than using data ? Job of creating data and job of using data are asynchronously performed ? Subject generating a predetermined task is separated from a subject processing the predetermined task ? Overall process for a task generation request is asynchronously performed ? Number of task generation requests that is greater than a number of task processing cases at all times is considered as a problem ? |
| 5 | Scheduler | Execution speed (N) - Variable depending on efficiency of a scheduling algorithm of a scheduler Memory demand (N) - Regardless of pattern use Memory bandwidth (N) - Regardless of pattern use Load balancing needs (N) - Regardless of pattern use | Application with possibility to simultaneously request a large number of jobs ? Application needing to sequentially perform requested jobs ? |

TABLE 10

| No. | Pattern Name | Architectural Driver Value & Rationales | Checklist |
|---|---|---|---|
| 1 | Acceptor/ Connector | Execution speed (N) - Running time may be increased by an additional step for connection. Memory demand (N) - Regardless of pattern use Memory bandwidth (N) - Regardless of pattern use Load balancing needs (N) - Regardless of pattern use | Corresponding system requires various connection roles in order to support a run-time behavior ? System where a job (configuration code) of establishing and initializing connection of requested service is mixed with a job (service processing code) of processing corresponding service ? Is it possible to reduce performance due to latency caused by a job of establishing and initializing connection ? Application requiring asynchronous connection ? |
| 2 | Active Object | Execution speed (H) - When a call and an execution point of a processing-intensive method are asynchronously operated, and when a client performs another job, and thus a running time is reduced. Memory demand (N) - Regardless of pattern use Memory bandwidth (N) - Regardless of pattern use Load balancing needs (N) - Regardless of pattern use | Various clients frequently access shared resources at the same time ? System where invocation and execution time are clearly distinguishable, and each execution order is not considered to be important ? Large number of processing-intensive methods exist ? Plurality of requesters of a service to be processed by a system, and a plurality of threads for solving a requested service exist ? Application with a high necessity for scheduling to process a request ? |
| 3 | Asynchronous Completion Token | Execution speed (H) - Effect of reduction in time occurs, since there is no need to | Job result of a requested operation is asynchronously output to a client application ? |

TABLE 10-continued

| No. | Pattern Name | Architectural Driver Value & Rationales | Checklist |
|---|---|---|---|
| | | perform a complex parsing job of data returned by a service<br>Memory demand (N) - Regardless of pattern use<br>Memory bandwidth (N) - Regardless of pattern use<br>Load balancing needs (N) - Regardless of pattern use | Communication overhead occurs due to demultiplexing of a completion event between a client and a service ?<br>Application requiring a long period of time during which a service initiator parses a service result value ? |
| 4 | Asynchronous Processing | Execution speed (H) - High-speed compared to general synchronous processing<br>Memory demand (N) - Regardless of pattern use<br>Memory bandwidth (N) - Regardless of pattern use<br>Load balancing needs (H) - Point of starting asynchronous processing may be adjusted and thus, load balancing is possible. | Application where a call sequence and an execution sequence for at least two consecutive jobs do not need to coincide ? |
| 5 | Double-Checked Locking Optimization | Execution speed (H) - More efficiently operated in a corresponding application, than in a general lock<br>Memory demand (N) - Regardless of pattern use<br>Memory bandwidth (N) - Regardless of pattern use<br>Load balancing needs (N) - Regardless of pattern use | Only a predetermined data needs to be managed ?<br>Needs to lock a predetermined data ? If locking of the predetermined data is required, the predetermined data is frequently locked ?<br>Accesses data using a cache memory in each processor ? |
| 6 | Event-based Asynchronous | Execution Speed (H) - Total execution time may be reduced by processing, in parallel, a large amounts of I/O jobs and another processing<br>Memory demand (N) - Regardless of pattern use<br>Memory bandwidth (H) - Bandwidth improvement effect may be expected, based on an aspect for efficiently running in parallel a large amounts of I/O jobs<br>Load balancing needs (N) - Regardless of pattern use | Application enabling a job consuming a considerable time to be performed in a background, and having a large number of forms for performing different jobs ? |
| 7 | Event-based, implicit invocation | Execution Speed (L) - It is impossible to guarantee a running time of a corresponding component<br>Memory demand (N) - Regardless of pattern use<br>Memory bandwidth (N) - Regardless of pattern use<br>Load balancing needs (H) - Load balancing is guaranteed in a neutral system implemented by distribution | Components forming a corresponding system perform communication using events between objects ?<br>Considerable time is consumed during dispatching of an event and registering of a listener ?<br>Procedures associated with performing of a predetermined event exist in different locations ?<br>Application enabling communication between objects to be complicated ? |
| 8 | Half-Sync/Half-Async | Execution Speed (H) - Processing speed is improved by simplifying communication between layers to be a single point (Message Queue)<br>Memory Demand (H) - It is inevitable to add a memory corresponding to a queue size, since a queuing layer is required<br>Memory bandwidth (H) - Increase in total I/O amount by asynchronously processing a time consumable network I/O job, | Asynchronous processing and synchronous processing are mixed when an application is operated ?<br>Significant imbalance in performance of each of asynchronous processing and synchronous processing exists ?<br>Structure enabling clear layering ?<br>Boundary-crossing penalty problem has a critical influence on performance ?<br>Application with a large amount of multiplexing<br>Domain where it is possible to |

TABLE 10-continued

| No. | Pattern Name | Architectural Driver Value & Rationales | Checklist |
|---|---|---|---|
| | | and the like<br>Load balancing needs (H) -<br>Queuing layer functions to<br>perform buffering of<br>Sync/Async layer | author a library that clearly<br>separates a behavior of a<br>network processing layer from<br>a behavior of a logic<br>processing layer in order to<br>implement an application ? |
| 9 | Iterative Refinement | Execution Speed (H) -<br>Increase in running speed,<br>when a single processing is<br>internally divided into several<br>iterations, and when the<br>several iterations are parallel<br>processable<br>Memory Demand (N) -<br>Additional memory is required<br>to store an intermediate<br>product in proportion to a<br>iteration number<br>Memory bandwidth (N) -<br>Regardless of pattern use<br>Load balancing needs (N) -<br>Regardless of pattern use | Application divided into parallel<br>tasks having a large number of<br>operation jobs in a single<br>processing step ?<br>Application requiring<br>considerable iterations in order<br>to achieve a predetermined<br>function ?<br>Application without needing to<br>consider synchronization costs<br>due to iteration operations ? |
| 10 | Monitor Object | Execution speed (L) - When<br>a monitor lock is used, multi-<br>core processing is operated<br>together with a single-core<br>processing every time locking<br>is performed. In an<br>application where Race<br>Condition does not occur, it is<br>difficult to consider a reason<br>that execution speed is<br>reduced.<br>Memory demand (H) - Small<br>memory usage since shared<br>data do not overlap<br>Memory bandwidth (L) -<br>Bandwidth may be<br>increased, when shared<br>data exists in only a single<br>place, and when all cores<br>access the shared data<br>Load balancing needs (N) -<br>Regardless of pattern use | Application where it is<br>important to maintain<br>concurrency of parallel-<br>requested processes ?<br>Corresponding application is<br>frequently maintained and<br>repaired ?<br>Domain where an issue<br>related to concurrency<br>management is more important<br>than an issue related to<br>performance improvement ?<br>Processes for achieving<br>concurrency need to be<br>performed through a simple<br>mechanism ? |
| 11 | Proactor | Execution speed (H) -<br>Decrease in time consumed<br>in context switching by<br>activating only a control of<br>logical threads for processing<br>corresponding events<br>Memory demand (N) -<br>Regardless of pattern use<br>Memory bandwidth (H) -<br>Increase in throughput by<br>asynchronously reading and<br>writing data through a socket<br>handle<br>Load balancing needs (N) -<br>Regardless of pattern use | System needing to<br>asynchronously process service<br>requests received from various<br>clients ?<br>Server needs to<br>simultaneously perform several<br>client requests ?<br>Application determining, as<br>problem, overhead, such as<br>context switching,<br>synchronization, and data<br>movement, occurring when<br>processing various requests ?<br>Application where it is difficult<br>to simultaneously process<br>requests of a large number of<br>users, and a long period of time<br>is taken to process a long-<br>duration request by a user ?<br>Application where a long-<br>duration operation such as an<br>I/O is considerably mixed with a<br>general processing operation ? |
| 12 | Reactor | Execution speed (L) -<br>Parallel events are efficiently<br>serialized, however,<br>performance is reduced in<br>view of multi-cores<br>Memory demand (N) -<br>Regardless of pattern use<br>Memory bandwidth (N) -<br>Regardless of pattern use<br>Load balancing needs (N) - | Needs to actually,<br>synchronously process service<br>requests that are simultaneously<br>received ?<br>System needing to multiplex,<br>demultiplex, and dispatch a<br>service to be processed ?<br>System enabling performance<br>to be seriously reduced by<br>additionally generating a large |

TABLE 10-continued

| No. | Pattern Name | Architectural Driver Value & Rationales | Checklist |
|---|---|---|---|
| | | Regardless of pattern use | number of threads corresponding to a number of various clients (Thread-Per-Connection) ? |
| 13 | Read/Write Lock | Execution speed (H) - Efficiently operated in a corresponding application, than one-side lock
Memory demand (N) - Regardless of pattern use
Memory bandwidth (N) - Regardless of pattern use
Load balancing needs (N) - Regardless of pattern use | Reading and writing of same memory need to be simultaneously performed ?
Application enabling a sufficient large number of Read/Write Threads to be generated ?
Application where it is important to ensure stability of data ? |
| 14 | Scoped Locking | Execution speed (L) - When a lock is used, multi-core processing is operated together with single-core processing every time locking is performed. In an application where Race Condition does not occur, it is difficult to consider a reason that execution speed is reduced.
Memory demand (N) - Regardless of pattern use
Memory bandwidth (N) - Regardless of pattern use
Load balancing needs (N) - Regardless of pattern use | Developed using C++ language?
(This item is an idiom using C++ language, rather than a pattern. Referring to contents, it is impossible to use in language such as java where a garbage collector is separated.)
Only a predetermined data is managed ?
Predetermined data has a small size enough to fit in memory ?
Range of a code accessing predetermined data is clear ? |
| 15 | Strategized Locking | Execution speed (H) - When a lock is used, a lock more efficient in an application than a general process may be used
Memory demand (N) - Regardless of pattern use
Memory bandwidth (N) - Regardless of pattern use
Load balancing needs (N) - Regardless of pattern use | Several locking mechanisms to be used are expressible using a single interface ?
Several locking mechanisms are applicable to a component, and a single mechanism is performed if needed ?
Component is independent of a predetermined synchronization mechanism ? |
| 16 | Thread Pool | Execution speed (H) - Pattern supporting logical concurrency
Memory demand (L) - Memory usage is increased, since shared data needs to be copied for each thread
Memory bandwidth (N) - Regardless of pattern use
Load balancing needs (H) - Load balancing is possible by using a thread pool | Hardware resources are not sufficient, compared to jobs needing to be performed ?
Same requests need to be simultaneously processed ? |
| 17 | Thread-Safe Interface | Execution speed (L) - Slight effect of reducing execution time is exhibited, since a point serialized at a moment in view of multi-core operation exists, and since a latent overhead element exists despite acquisition and release of a unnecessary lock being minimized
Memory demand (N) - Regardless of pattern use
Memory bandwidth (N) - Regardless of pattern use
Load balancing needs (N) - Regardless of pattern use | Needs to manage predetermined data so that only a single thread accesses the predetermined data ?
Accesses data needing to be repeatedly locked within a function ?
Minimizing of locking overhead is a requirement with a higher priority ?
Application where it is important to prevent self-deadlock from occurring ? |
| 18 | Thread-Specific Storage | Execution speed (H) - Minimization of access to global data by maintaining thread data --> Minimization of locking overhead
Memory demand (L) - | Frequently accesses each thread for the same global data ?
Each thread may clearly define state information that each thread needs to maintain in local with respect to shared global |

TABLE 10-continued

| No. | Pattern Name | Architectural Driver Value & Rationales | Checklist |
|---|---|---|---|
| | | Memory usage is increased, since a local storage is assigned for thread Memory bandwidth (H) - Requirement of a bandwidth is reduced by accessing local data instead of global data Load balancing needs (N) - Use of thread pool does not have a load balancing strategy | data ? Application where starvation and deadlocking of global data frequently occur ? |

Information regarding architectural driver values for each architectural pattern included in Table 8 may be loaded in a supporting implement, namely, in an architectural decision supporter, based on the rationales of Table 9, and the information loaded in the architectural decision supporter may be provided as reference data.

Patterns found as a result of a search operation using information of Table 8 may be divided into two groups and may be provided. A first pattern may include information accurately identical to four architectural driver attribute values of a given system, and may be classified as a recommended pattern. A second pattern may be partially identical to the four architectural driver attribute values, and may be classified as a partially adaptable pattern. The "Leader/Followers" pattern and a "Thread Pool" pattern may be classified as recommended patterns satisfying all of the four architectural driver attribute values, and other patterns that are partially associated with the architectural driver attribute values may be classified as partially adaptable patterns.

Figure 22:
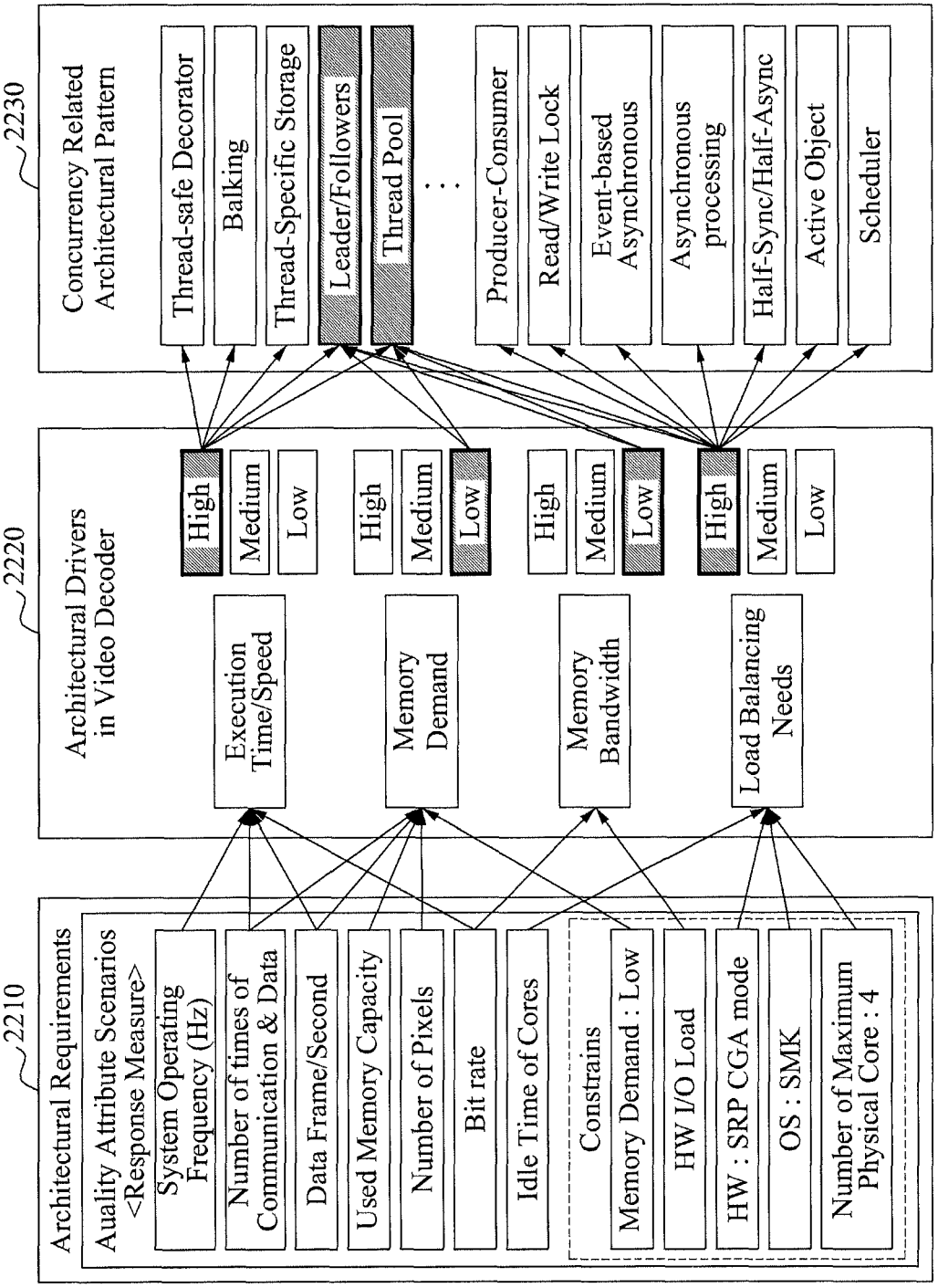
FIG. 22 illustrates an example of determining a multimedia architectural pattern according to example embodiments.

FIG. 22 illustrates an example of determining a multimedia architectural pattern according to example embodiments.

Four architectural drivers 2220 may be required based on requirements 2210 expected when a single core is transformed to a multi-core in a video decoder system as an example system. The four architectural drivers 2220 may include, for example, an execution time/speed, a memory demand, a memory bandwidth, and load balancing needs.

Priorities of the four architectural drivers 2220 may be determined, and 12 concurrency-related architectural patterns 2230 may be found as a result of searching based on the mapping table shown in Table 8. Among the 12 concurrency-related architectural patterns 2230, the "Leader/Follower" pattern and the "Thread Pool" pattern may be determined as recommended patterns, since the two patterns are associated with four architectural driver values. Additionally, 10 patterns correlating with at least one architectural driver values may be determined as partially adaptable patterns.

Figure 23:
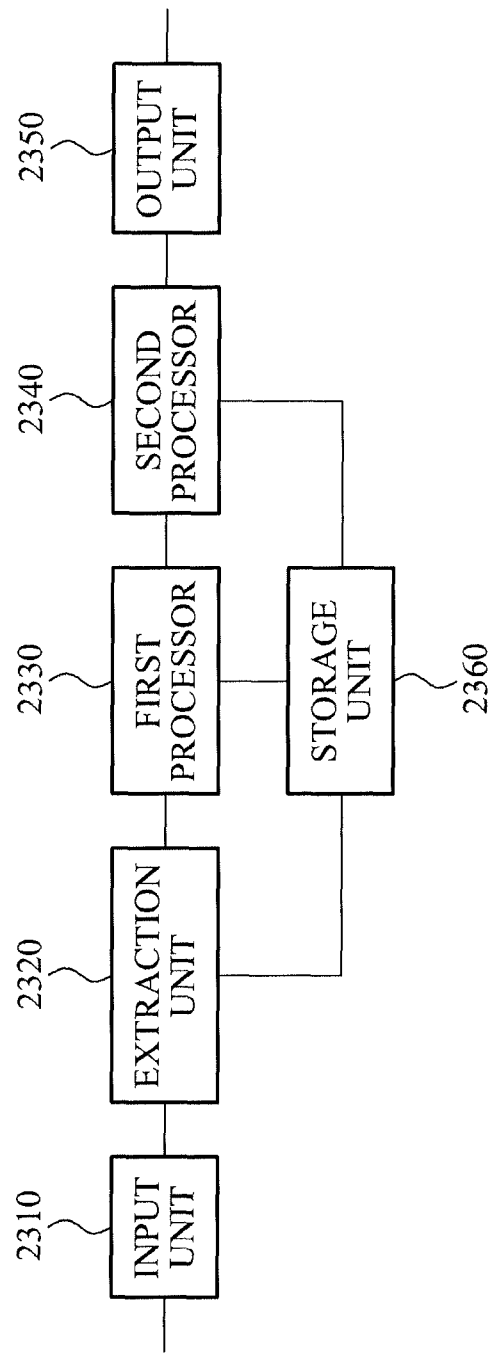
FIG. 23 illustrates a block diagram of an architecture transformation apparatus for transforming a single-core based architecture to a multi-core based architecture according to example embodiments.

FIG. 23 illustrates a block diagram of an architecture transformation apparatus for transforming a single-core based architecture to a multi-core based architecture according to example embodiments.

Referring to FIG. 23, the architecture transformation apparatus may include an input unit 2310, an extraction unit 2320, a first processor 2330, a second processor 2340, an output unit 2350, and a storage unit 2360.

The input unit 2310 may receive an input of a single-core based legacy source code. A single-core based legacy system may refer to a general system generated for a single core, and may include, for example, an H.264 video decoder system. The single-core based legacy source code may be extracted through a processor from single-core based software, and the extracted single-core based legacy source code may be input to the input unit 2310.

The extraction unit 2320 may extract a functional requirement and a non-functional requirement of a software architecture, based on the single-core based legacy source code. The functional requirement and the non-functional requirement may be used for transformation to a multi-core based architecture.

The extraction unit 2320 may extract the functional requirement by classifying the single-core based legacy source code according to a function description, a data structure, and a call relationship.

The extraction unit 2320 may also extract the non-functional requirement, based on a quality attribute associated with transformation of a single-core based architecture to a multi-core based architecture. For example, performance may be associated with transformation of a single-core based architecture to a multi-core based architecture.

The first processor 2330 may generate alternative architectures based on the functional requirement and the non-functional requirement, and may determine at least one optimal alternative architecture based on a quality attribute, among the alternative architectures.

The first processor 2330 may generate alternative architectures based on a correlation between architectural drivers and at least one architectural pattern, a checklist used to select the at least one architectural pattern, and constraints.

The first processor 2330 may generate alternative architectures based on a mapping table where concurrency-related architectural patterns and architectural drivers are mapped to each other.

The first processor 2330 may determine an optimal alternative architecture through a trade-off analysis of the alternative architectures.

The second processor 2340 may determine a component corresponding to the at least one optimal alternative architecture, may instantiate the at least one optimal alternative architecture, and may perform quantitative evaluation with respect to the at least one optimal alternative architecture to determine whether a performance of a system is improved in proportion to a number of multi-cores.

The second processor 2340 may search for components using an architectural decision supporter. The second processor 2340 may search for components on an architecture from a software asset storage, using the architectural decision supporter. The software asset may store information on a function of a component, a name of the component, and components mapped with the function and the name.

The second processor 2340 may determine a physical component among the found components, based on reference data supported by the architectural decision supporter. Here, the physical component may perform a role of a component identified on an authored alternative architecture. The reference data may include detailed information regarding a component, and a software asset where a component belongs.

The second processor 2340 may quantitatively evaluate the authored alternative architecture using a system prototype having a quantitatively measurable performance, based on a code developed based on a single core.

The output unit 2350 may output the at least one optimal alternative architecture where the quantitative evaluation is performed.

The storage unit 2360 may store the functional requirement, the non-functional requirement, the quality attribute, the alternative architectures, and the architectural decision supporter. Additionally, the storage unit 2360 may store the software asset, and pros and cons of an architecture that are required for the trade-off analysis.

The methods according to the above-described example embodiments may be recorded in non-transitory computer-readable media including program instructions to implement various operations embodied by a computer. The embodiments can be implemented in computing hardware and/or software, such as (in a non-limiting example) any computer that can store, retrieve, process and/or output data and/or communicate with other computers. The results produced can be displayed on a display of the computing hardware. Examples of the computer-readable recording media include a magnetic recording apparatus, an optical disk, a magneto-optical disk, and/or a semiconductor memory (for example, RAM, ROM, etc.). Examples of the magnetic recording apparatus include a hard disk device (HDD), a flexible disk (FD), and a magnetic tape (MT). Examples of the optical disk include a DVD (Digital Versatile Disc), a DVD-RAM, a CD-ROM (Compact Disc-Read Only Memory), and a CD-R (Recordable)/RW. The media may also include, alone or in combination with the program instructions, data files, data structures, and the like. The program instructions recorded on the media may be those specially designed and constructed for the purposes of the example embodiments, or they may be of the kind well-known and available to those having skill in the computer software arts.

Moreover, the embodiments of the architecture transformation apparatus may include one or more processors to execute at least one of the above-described units and methods.

Further, according to an aspect of the embodiments, any combinations of the described features, functions and/or operations can be provided.

Although example embodiments have been shown and described, it would be appreciated by those skilled in the art that changes may be made in these example embodiments without departing from the principles and spirit of the disclosure, the scope of which is defined in the claims and their equivalents.

What is claimed is:

1. A method of transforming a single-core based architecture to a multi-core based architecture, the method comprising:
   extracting a functional requirement and a non-functional requirement of a software architecture, the extracted functional requirement and the non-functional requirement being elicited based on a single-core based legacy source code;
   generating alternative architectures based on the extracted functional requirement and the non-functional requirement, storing the alternative architectures, determining an alternative architecture among the alternative architectures based on trade-off factors, and authoring the alternative architecture;
   determining a component corresponding to the authored alternative architecture, and instantiating the authored alternative architecture; and
   performing an evaluation with respect to the authored alternative architecture, to determine whether a performance of a system is improved in proportion to a number of multi-cores.

2. The method of claim 1, wherein the storing of the functional requirement and the non-functional requirement comprises:
   analyzing a source code of a single-core based legacy system;
   classifying functions of the legacy system by applying an activity diagram to a result of the analyzing;
   generating a use case specification based on an order of events related to an operation of performing the classified functions;
   extracting the non-functional requirement of the software architecture using a quality attribute scenario;
   receiving an input of constraints restricting implementation of the classified functions;
   generating a software requirement specification based on the classified functions, the non-functional requirement, and the constraints; and
   storing the software requirement specification.

3. The method of claim 2, wherein the analyzing of the source code comprises extracting a function description, a data structure, and a call relationship from the source code of the single-core based legacy system, and generating a source code analysis report.

4. The method of claim 3, wherein the classifying of the functions of the system comprises converting contents of the source code analysis report into a visible form using an activity diagram of a Unified Modeling Language (UML), and generating a system activity diagram.

5. The method of claim 4, wherein the generating of the use case specification comprises generating a use case specification based on the system activity diagram, by reflecting a parallelism on each step of a use case, the parallelism indicating whether an activity is executable in parallel in a plurality of processors.

6. The method of claim 5, wherein the parallelism comprises an activity where a plurality of functions are executable in parallel in the plurality of processors, and an activity where domain data is divided and the same plurality of functions is executable in parallel in the plurality of processors.

7. The method of claim 2, wherein the constraints comprise factors restricting either a selection of an architectural pattern or a technical implementation of each component during the authoring of the alternative architecture.

8. The method of claim 2, wherein the generating of the software requirement specification comprises generating a software requirement specification based on the use case specification, the quality attribute scenario, and the constraints.

9. The method of claim 1, wherein the authoring of the alternative architecture comprises:
   generating a single-core based reference architecture;
   acquiring at least one architectural pattern using an architectural decision supporter;
   generating the alternative architectures, based on a software requirement specification, the single-core based reference architecture, and the at least one applicable architectural pattern; and determining the alternative architecture among the alternative architectures.

10. The method of claim 9, wherein the generating of the single-core based reference architecture comprises:
    comparing activities identified in the system activity diagram with an existing source code structure, and identifying activities to be included together in a single component;
    mapping concurrent components to corresponding physical components, using the single component as a concurrent component; and
    comparing the concurrent components with an operation order of a system, and generating a static architecture and a dynamic architecture.

11. The method of claim 9, wherein the acquiring of the architectural pattern comprises acquiring the at least one applicable architectural pattern from the architectural decision supporter, based on an architectural driver, the architectural decision supporter being an Architectural Knowledge (AK) manager comprising the architectural driver, and the at least one applicable architectural pattern.

12. The method of claim 9, wherein the generating of the alternative architectures comprises generating the alternative architectures, based on a correlation between an architectural driver and the at least one applicable architectural pattern, a checklist used to select the at least one applicable architectural pattern, and the constraints.

13. The method of claim 12, wherein the determining of the alternative architecture comprises:
    generating a quality attribute tree where a priority is reflected based on a performance-related scenario among quality attribute scenarios; and
    determining the alternative architecture through a trade-off analysis, based on a development priority of a scenario assigned to the quality attribute tree,
    wherein the quality attribute tree is divided into a quality attribute, a quality concern, and a quality attribute scenario in sequence.

14. The method of claim 1, wherein the determining of the component comprises:
    searching for components using an architectural decision supporter;
    determining a component corresponding to the authored alternative architecture, among the found components; and
    modifying the determined component in a form suitable for a multi-core based architecture.

15. The method of claim 14, wherein the searching of the components comprises searching for, through the architectural decision supporter, a component already developed among components on an architecture, by using a name of a component or a function of a component as a keyword.

16. The method of claim 14, wherein the determining of the component comprises determining a physical component among the found components, based on reference data supported by the architectural decision supporter, the physical component performing a role of a component identified on the authored alternative architecture.

17. The method of claim 1, wherein the performing of the evaluation comprises:
    generating a prototype for evaluating the authored alternative architecture; and
    evaluating the authored alternative architecture for each performance factor based on the prototype,
    wherein the evaluation is quantitative.

18. The method of claim 17, wherein the generating of the prototype comprises generating a system prototype having a quantitatively measurable performance, based on the authored alternative architecture and a code developed based on a single core.

19. The method of claim 18, wherein the evaluating of the authored alternative architecture comprises measuring evaluation results based on a criterion for measuring a response among quality attribute scenarios, and quantitatively evaluating the authored alternative architecture based on an acceptance range.

20. A non-transitory computer readable recording medium storing a program to cause a computer to implement the method of claim 1.

21. An apparatus for transforming a single-core based architecture to a multi-core based architecture, the apparatus comprising:
    an input unit to receive an input of a single-core based legacy source code;
    an extraction unit to extract a functional requirement and a non-functional requirement of a software architecture, based on the single-core based legacy source code;
    a first processor to generate alternative architectures based on the extracted functional requirement and the extracted non-functional requirement, and to determine at least one alternative architecture among the generated alternative architectures based on trade-off factors;
    a second processor to determine a component corresponding to the at least one alternative architecture, to instantiate the at least one alternative architecture, and to perform an evaluation with respect to the at least one alternative architecture to determine whether a performance of a system is improved after the transformation;
    an output unit to output the at least one alternative architecture where the evaluation is performed; and
    a storage unit to store the functional requirement, the non-functional requirement, a quality attribute, the alternative architectures, and an architectural decision supporter.

22. The apparatus of claim 21, wherein the determining at least on alternative architecture further comprises:
    a quality attribute tree where a priority is reflected based on a performance-related scenario among quality attribute scenarios; and
    an alternative architecture through a trade-off analysis, based on a development priority of a scenario assigned to the quality attribute tree,
    wherein the quality attribute tree is divided into the quality attribute, a quality concern, and a quality attribute scenario in sequence.

23. A method of determining a multimedia architectural pattern to transform a single-core based architecture to a multi-core based architecture, the method comprising:
    receiving an input of architectural drivers comprising an execution time/speed, a memory demand, a memory bandwidth, and load balancing needs;
    determining priorities of the architectural drivers based on a functional requirement and a non-functional requirement of a software architecture, the functional requirement and the non-functional requirement being extracted from the software architecture; and
    determining at least one architectural pattern from a mapping table comprising concurrency-related architectural patterns and the architectural drivers, based on the determined priorities.

24. The method of claim 23, wherein the determining of the at least one architectural pattern further comprises:
    determining, as a recommended pattern, an architectural pattern matched to the determined priorities of the architectural drivers, and determining, as a partially adaptable pattern, an architectural pattern partially matched to the determined priorities of the architectural drivers,
wherein the concurrency-related architectural patterns and the priorities of the architectural drivers are mapped to each other based on a checklist.

25. The method of claim 1, wherein an error is prevented from occurring during authoring of an architecture by using a concurrency-related software architectural pattern that is previously evaluated.

* * * * *

UNITED STATES PATENT AND TRADEMARK OFFICE
CERTIFICATE OF CORRECTION

PATENT NO. : 9,021,430 B2  
APPLICATION NO. : 13/332008  
DATED : April 28, 2015  
INVENTOR(S) : Soo Yong Park et al.

Page 1 of 1

It is certified that error appears in the above-identified patent and that said Letters Patent is hereby corrected as shown below:

In the Claims

Column 46, Line 39, In Claim 22, delete "on" and insert -- one --, therefor.

Signed and Sealed this
Twenty-ninth Day of September, 2015

Michelle K. Lee
*Director of the United States Patent and Trademark Office*